United States Patent
Hon et al.

(10) Patent No.: US 12,190,718 B2
(45) Date of Patent: Jan. 7, 2025

(54) WIRELESS CONTROL OF ELECTRONIC DEVICES OF MULTI-TENANT STRUCTURES

(71) Applicant: Xiber, LLC, Indianapolis, IN (US)

(72) Inventors: Stephen Hon, Indianapolis, IN (US);
Timothy Hon, Indianapolis, IN (US)

(73) Assignee: Xiber, LLC, Indianapolis, IN (US)

( * ) Notice: Subject to any disclaimer, the term of this patent is extended or adjusted under 35 U.S.C. 154(b) by 40 days.

(21) Appl. No.: 16/827,066

(22) Filed: Mar. 23, 2020

(65) Prior Publication Data

US 2020/0302778 A1 Sep. 24, 2020

Related U.S. Application Data

(60) Provisional application No. 62/822,149, filed on Mar. 22, 2019.

(51) Int. Cl.
| | | |
|---|---|---|
| G08C 17/02 | (2006.01) | |
| G05B 15/02 | (2006.01) | |
| H04L 9/40 | (2022.01) | |

(52) U.S. Cl.
CPC ............. *G08C 17/02* (2013.01); *G05B 15/02* (2013.01); *H04L 63/10* (2013.01); *H04L 63/107* (2013.01); *H04L 63/108* (2013.01)

(58) Field of Classification Search
CPC ...... H04L 63/10; H04L 63/107; H04L 63/108
See application file for complete search history.

(56) References Cited

U.S. PATENT DOCUMENTS

| | | | |
|---|---|---|---|
| 10,319,213 B1* | 6/2019 | Conner | G01K 3/005 |
| 10,477,398 B2* | 11/2019 | Sonasath | G06Q 10/02 |
| 2006/0248567 A1* | 11/2006 | Vanderhoff | H04L 12/2801 |
| | | | 725/120 |
| 2016/0017640 A1* | 1/2016 | Soloway | G07C 9/00309 |
| | | | 70/91 |
| 2016/0282825 A1* | 9/2016 | Kariguddaiah | G05B 15/02 |
| 2018/0190051 A1* | 7/2018 | Outwater | H04L 63/0823 |
| 2020/0302778 A1* | 9/2020 | Hon | H04L 63/108 |

* cited by examiner

*Primary Examiner* — Harris C Wang
(74) *Attorney, Agent, or Firm* — Taft Stettinius & Hollister LLP

(57) ABSTRACT

Systems and methods include providing a user with wireless control of electronic devices associated with a multi-tenant structure to enable a user to engage in wireless control of the electronic devices associated with permissions granted to the user. Embodiments of the present disclosure relate to receiving associated permissions granting wireless control of partitioned electronic devices to the user from a central aggregation control system. The partitioned electronic devices are associated with the multi-tenant structure that are under wireless control and have the associated permissions granting wireless control to the user. The electronic devices to provide the user with wireless control of the partitioned electronic devices are determined based on the associated permissions granted to the user. Wireless control of the partitioned electronic devices is automatically activated when the associated permissions for the user grant the user with the wireless control of the partitioned electronic devices.

19 Claims, 4 Drawing Sheets

200

210
Identify electronic devices associated with multi-tenant structure that are under wireless control.

220
Determine partitioned electronic devices to provide the user with wireless control of based on associated granted permissions.

230
Aggregate wireless control of the partitioned electronic devices to the user that correspond to the associated permissions granted to the user.

240
Determine and aggregate wireless control of the partitioned electronic devices based on the hierarchy of permissions that is granted to each supervisory user.

FIG.2

WIRELESS CONTROL OF ELECTRONIC DEVICES OF MULTI-TENANT STRUCTURES

BACKGROUND

Large apartment complexes and/or other tenant facilities such as condominiums and/or town homes are often typically managed by a single management entity. That single management entity may not only manage a single apartment complex at a single location but may also manage numerous apartment complexes, condominium complexes, and/or town home facilities that are positioned in numerous different geographic locations. In doing so, the single management entity may be responsible for provisioning different types of access to each of the numerous tenants that inhabit in the apartment complexes, condominium complexes, and/or town home facilities.

The management entity responsible for granting the appropriate access and/or control for each tenant is required to manage such access and/or control for numerous tenants and often times at numerous different locations. Such access and/or control that is to be provisioned differs per tenant. Conventionally, each representative of the management entity is required to determine the appropriate access and/or control that each tenant is entitled to at the time of signing the lease and then arrange for the tenant to obtain the appropriate access and/or control as well as terminating the appropriate access and/or control for each tenant that is no longer engaged in a lease. Such manual determination and allocation absorbs significant resources for the management entity when numerous tenants are moving in as well as departing often times requiring numerous representatives of the management entity to be on-site to assure the appropriate provisioning as well as terminating occurs.

BRIEF SUMMARY

Embodiments of the present disclosure relate to a system that enables a management entity that is responsible for provisioning the appropriate access and/or control of different features of an apartment complex, condominium facilities, and/or town home facilities to automatically execute the provisioning and/or terminating upon when a tenant begins a lease and/or terminates a lease. A system may be implemented to aggregate wireless control of a plurality of electronic devices associated with a multi-tenant structure to enable a user to engage in wireless control of the plurality of electronic devices associated with permissions granted to the user. The system includes at least one processor and a memory coupled with the processor. The memory includes instructions that when executed by the processor cause the processor to identify the electronic devices associated with the multi-tenant structure that are under wireless control based on a unique identifier associated with each of the electronic devices. Each unique identifier associated with each of the electronic devices enables each of the engaged electronic devices to be engaged via wireless control. The processor is configured to determine a plurality of partitioned electronic devices to provide the user with wireless control of the partitioned electronic devices based on associated permissions granted to the user. The partitioned electronic devices are a set of electronic devices included in the plurality of electronic devices that have the associated permission granting wireless control of the partitioned electronic devices to the user. The processor is configured to aggregate wireless control of the partitioned electronic devices to the user with unique identifiers that correspond to the associated permissions granted to the user. The associated permissions granted to the user enable the user to have wireless control over the partitioned electronic devices with the associated permissions and prevent the user from having wireless control of the electronic devices that do not have the associated permissions.

In an embodiment, a method may be implemented for aggregating wireless control of a plurality of electronic devices associated with a multi-tenant structure to enable a user to engage in wireless control of the plurality of electronic devices associated with permissions granted to the user. The electronic devices associated with the multi-tenant structure that are under wireless control may be identified based on a unique identifier associated with each of the electronic devices. Each unique identifier associated with each one of the electronic devices enables each of the electronic devices to be engaged via wireless control. A plurality of partitioned electronic devices to provide the user with wireless control of the partitioned electronic devices based on associated granted permissions granted to the user. The partitioned electronic devices are a set of electronic devices included in the plurality of electronic devices that have the associated permissions granted wireless control of the partitioned electronic devices to the user. Wireless control of the partitioned electronic devices is aggregated to the user with unique identifiers that correspond to the associated permissions granted to the user. The associated permissions granted to the user enable the user to have wireless control over the partitioned electronic devices with the associated permissions and prevent the user from having wireless control of the electronic devices that do not have the associated permissions.

Further embodiments, features, and advantages, as well as the structure and operation of the various embodiments, are described in detail below with reference to the accompanying drawings.

BRIEF DESCRIPTION OF THE DRAWINGS

Embodiments are described with reference to the accompanying drawings. In the drawings, like reference numbers may indicate identical or functionally similar elements.

FIG. 2 shows an illustration of a method for aggregating wireless control;

DETAILED DESCRIPTION

Embodiments of the disclosure generally relate to providing a management entity that is responsible to manage the provisioning and/or control of different features of the apartment, condominium, and/or town house complex to automatically execute the provisioning but in doing so providing wireless access to the provisioned features to the user that has been granted the permission to wirelessly engage the provisioned features. In an example embodiment, management entity is responsible for provisioning different features of the apartment complex to numerous different tenants that are entering a lease as well as terminating the access and/or control to different features of numerous different tenants terminating a lease. In doing so, the management entity may automatically aggregate wireless control to the different electronic devices that are associated with the features of the apartment complex that that the user may be granted access.

For example, the management entity may automatically grant the user electronic access to the locks associated with the apartment that the user is entering a lease to rent such that the user may wirelessly control the electronic locks once granted permission by the management entity. Thus, the management entity may easily automatically grant wireless access and/or terminate wireless to the electronic devices associated with the features of the apartment complex that the user may be granted permission to access.

In the Detailed Description herein, references to "one embodiment", an "embodiment", and "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in art to affect such feature, structure, or characteristic in connection with other embodiments whether or not explicitly described.

The following Detailed Description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the Detailed Description is not meant to limit the embodiments described below.

System Overview

Figure 1:
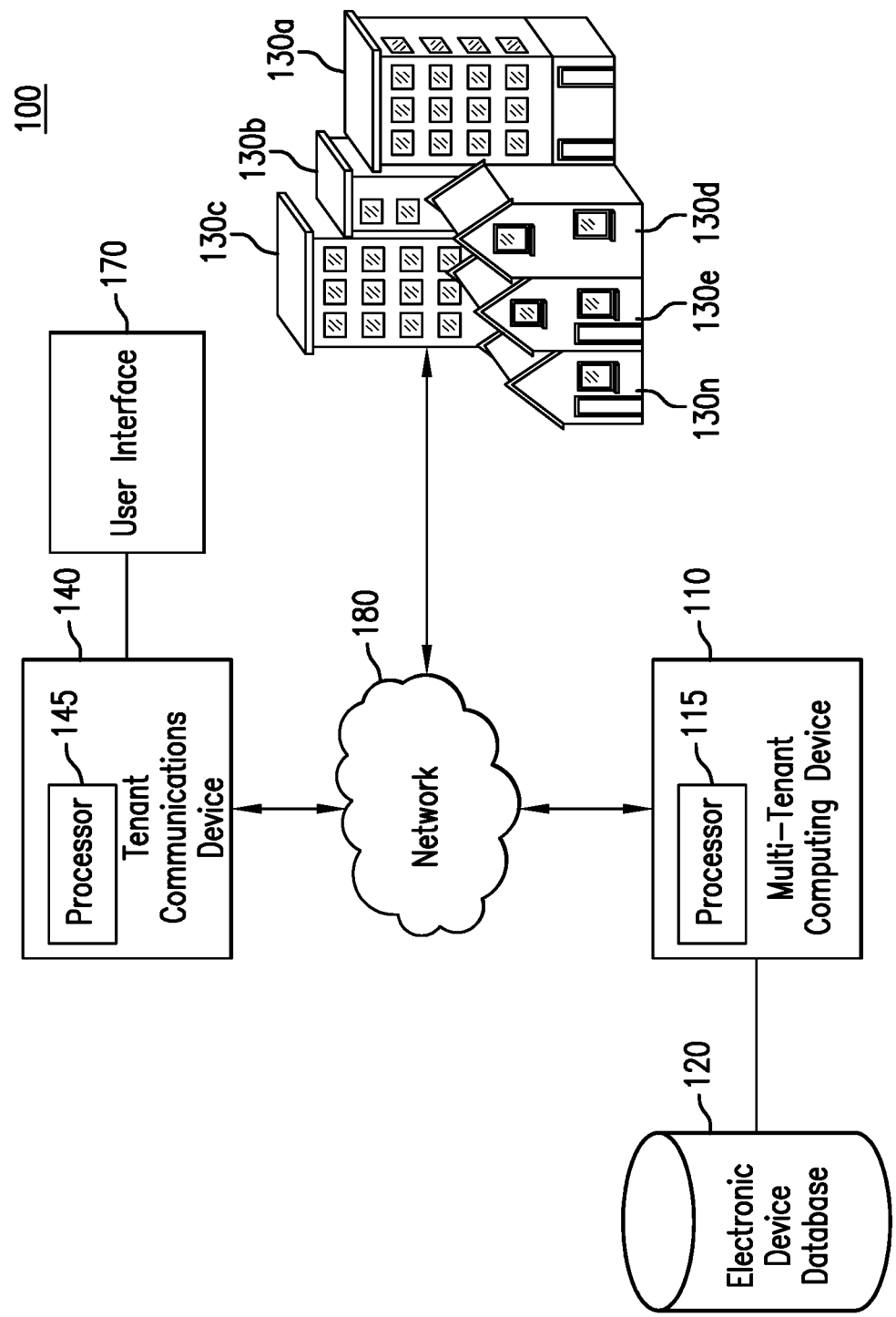
FIG. 1 shows an illustration of a multi-tenant structure control system.

As shown in FIG. 1, a multi-tenant structure control system 100 includes a multi-tenant computing device 110, an electronic device database 120, a tenant communications device 140, a user interface 170, a network 180, and a plurality of multi-tenant structures 130(a-n), where n is an integer equal to or greater than one. Multi-tenant computing device 110 includes a processor 115. Tenant communications device 140 includes a processor 145.

Multi-tenant computing device 110 may aggregate wireless control of a plurality of electronic devices (not shown) associated with a multi-tenant structure 130(a-n) to enable a user to engage in wireless control of the electronic devices associated with permissions granted to the user. Multi-tenant structures 130(a-n) may include structures where numerous tenants may inhabit multi-tenant structures 130(a-n). For example, multi-tenant structure 130a is an apartment building that includes numerous different apartments that may be inhabited by numerous different tenants with each tenant leasing a corresponding apartment included in multi-tenant structure 130a. Each tenant may be granted permissions to access specific portions of multi-tenant structure 130a that each of the tenants are inhabiting based on the lease agreement agreed between each of the tenants and the owner of multi-tenant structure 130a. For example, each tenant that is inhabiting apartment building 130b is granted access to the corresponding apartment that the owner of the apartment building 130b has agreed to lease to each tenant to inhabit.

Multi-tenant structures 130(a-n) may also include structures where numerous owners may inhabit multi-tenant structures 130(a-n). For example, multi-tenant structure 130c is a condominium building that includes numerous different condominiums that may be inhabited by numerous different owners with each owner owning a corresponding condominium included in multi-tenant structure 130c. Each owner may be granted permissions to access specific portions of multi-tenant structure 130a that each of the owners are inhabiting based on the ownership agreement agreed upon between each of the owners and the owner of multi-tenant structure 130c. For example, each owner that is inhabiting condominium building 130c is granted access to the corresponding condominium that the owner of the condominium building 130c has agreed to sell to each owner to inhabit. For simplicity, the space that a tenant and/or owner that is granted permission to inhabit may be referred to the tenant space from here on out.

As a result, multi-tenant structures 130(a-n) include structures where numerous tenants and/or owners are granted permissions to inhabit and in doing so multi-tenant structures 130(a-n) are managed by a managing entity such that as each tenant and/or owner inhabit multi-tenant structures 130(a-n), such inhabitance and/or use of multi-tenant structures 130(a-n) by each tenant and/or owner is managed by the managing entity. For example, the managing entity may maintain multi-tenant structures 130(a-n) such that the user in inhabiting multi-tenant structures 130(a-n) is maintained to be of sufficient quality for the tenants and/or owners. In such an example, each tenant and/or owner may request that the managing entity take action to perform repairs of the tenant space that they are residing and so on. In another example, the managing entity may manage the permissions that each tenant and/or owner may have under the corresponding agreement with the owner of multi-tenant structures 130(a-n). In such an example, the managing entity may ensure that each tenant and/or owner has access to and the use of the corresponding tenant space that the tenant and/or owner have permissions to inhabit while not having access to the remaining tenant spaces that the tenant and/or owner do not have permissions to inhabit.

Thus, multi-tenant structures 130(a-n) include structures where the permissions of numerous tenants and/or owners to inhabit multi-tenant structures 130(a-n) is managed by the managing entity of multi-tenant structures 130(a-n). In doing so, the managing entity grants and/or revokes the permissions of each tenant and/or structure as well as maintain the permissions of each tenant and/or structure based on the agreement each tenant and/or owner has with the owner of multi-tenant structures 130(a-n) to inhabit the corresponding tenant space included in multi-tenant structures 130(a-n). Multi-tenant structures 130(a-n) may include but are not limited to apartment complexes, condominium complexes, town house complexes, houses positioned in sub-divisions, gated sub-divisions of houses, and/or any other type of multi-tenant structure 130(a-n) that includes a plurality of tenants and/or owners that have been granted permissions to inhabit multi-tenant structures 130(a-n) and such permissions are maintained by a management entity that will be apparent to those skilled in the relevant art(s) without departing from the spirit and scope of the invention. Multi-tenant structures 130(a-n) may be positioned in the same geographic location, positioned in different geographic locations, and/or any other type of position relative to each other such that the management entity continues to maintain the permissions to inhabit multi-tenant structures 130(a-n) of each tenant and/or owner that will be apparent to those skilled in the relevant art(s) without departing from the spirit and scope of the invention.

The permissions for each tenant and/or owner that inhabit multi-tenant structures 130(a-n) may be associated with granting the appropriate access to each tenant and/or owner to the appropriate tenant space that each tenant and/or owner have entered an agreement to inhabit as well as the different amenities of multi-tenant structures 130(a-n) that is granted access to each tenant and/or owner via the agreement. For example, each tenant and/or owner may be granted the permissions to have the appropriate access to the actual tenant space that each tenant and/or owner has been granted permission to inhabit in based on the agreement. In another example, each tenant and/or owner may be granted the permissions to access each of the different amenities of multi-tenant structures 130(a-n) that each tenant and/or owner has been granted permission to access based on the agreement. In such an example, each tenant and/or owner may be granted permissions to access the pool, the parking garage, a specific garage, a parking lot, a tennis court, a basketball court, a volleyball court, a workout room, a multi-purpose room, a main entrance for multi-tenant structures 130(a-n), a main gate for multi-tenant structures 130(a-n) and/or any other type of amenities associated with multi-tenant structures 130(a-n) that a tenant and/or owner may be granted permissions to access based on the agreement that will be apparent to those skilled in the relevant art(s) without departing from the spirit and scope of the invention.

The permissions for each tenant and/or owner that inhabit multi-tenant structures 130(a-n) may also be associated with preventing the inappropriate access to any tenant and/or owner that is prevented any such access via the agreement. For example, each tenant and/or owner may be prevented access to any tenant space that each tenant and/or owner has not been granted permission to inhabit based on the agreement. In doing so, each tenant and/or owner is only granted permission to access the specific tenant space that each tenant and/or owner has been granted permission to inhabit via the agreement while preventing any such access to any tenant space that any tenant and/or owner has not been granted permissions to inhabit. In other example, each tenant and/or owner may be prevented access to specific amenities that each tenant and/or owner is not granted permission to access via the agreement. In such an example, only tenants and/or owners that are paying for an indoor parking spot via the agreement may have access to the parking garage associated with multi-tenant structures 130(a-n) while the other tenants and/or owners that are not paying for an indoor parking spot via the agreement may not have access to the parking garage.

The permissions granted to each tenant and/or owner with regard to the access multi-tenant structures 130(a-n) granted to each tenant and/or owner as well as access that is prevented to each tenant and/or owner based on the agreement for each tenant and/or owner to inhabit multi-tenant structures 130(a-n) may be the aggregation of wireless control of a plurality of electronic devices associated with multi-tenant structures 130(a-n). In doing so, the permissions enable a user to engage in wireless control of the plurality electronic devices associated with permissions granted to the user. The user may be an individual that is granted permissions to inhabit multi-tenant structures 130(a-n) and in doing so granted permissions to access multi-tenant structures as dictated by the agreement to inhabit multi-tenant structures 130(a-n).

For example, the user may be a tenant that has entered into an agreement to lease an apartment included in multi-tenant structures 130(a-n). In another example, the user may be an owner that has entered into an agreement to own a townhouse included in multi-tenant structures 130(a-n). In another example, the user may be an individual that is listed on the agreement as an inhabitant of multi-tenant structures 130(a-n) and thereby granted permissions to access multi-tenant structures 130(a-n). In such an example, the user may be a spouse, sibling, child, roommate, and/or any other inhabitant of multi-tenant structures 130(a-n) that be may co-habitating with the tenant and/or owner of the tenant space included in multi-tenant structures 130(a-n) and thereby requiring permissions to access multi-tenant structures 130(a-n). Thus, the user may be any individual that inhabits multi-tenant structures 130(a-n) thereby requiring permissions to access multi-tenant structures 130(a-n) that will be apparent to those skilled in the relevant art(s) without departing from the spirit and scope of the invention. For simplicity, the individual granted permissions to multi-tenant structures 130(a-n) is to be referred to as the user from here on out.

Multi-tenant computing device 110 may aggregate the wireless control of a plurality of electronic devices associated with a multi-tenant structure 130(a-n) to enable a user to engage in wireless control of the plurality of electronic devices associated with permissions granted to the user. In doing so, the permissions granted to the user with regard to the access of multi-tenant structures 130(a-n) may be executed based on granting permissions to the user to have wireless control of the different electronic devices associated with multi-tenant structures 130(a-n). The electronic devices are devices that are associated with multi-tenant structures 130(a-n) that when wirelessly controlled provide the user with access to different portions of multi-tenant structures 130(a-n) and/or control over different features associated with multi-tenant structures 130(a-n). Without such permissions to have wireless control over the electronic devices, the user may be prevented from having access to the different portions of multi-tenant structures 130(a-n) and/or be prevented from having control over the different features associated with multi-tenant structures 130(a-n). Thus, the electronic devices that may be wirelessly controlled by the user when granted permissions to do so thereby enable the user to engage the different portions and/or features associated with multi-tenant structures 130(a-n).

For example, the electronic devices include the electronic locks that are associated with the private egress for each tenant space included in multi-tenant structures 130(a-n). As noted above, the user is granted permissions to access the tenant space based on the agreement that the user enters to inhabit the specific tenant space. The tenant space then has electronic locks associated with each private egress that enables an individual to enter and/or prevent the individual from entering the specific tenant space that may be wirelessly controlled by the user once the appropriate permissions are granted to the user. In doing so, the user may wirelessly lock and/or unlock the electronic locks to enable the doors associated with the different private egresses to be locked and/or unlocked thereby enabling the user to regulate the access of themselves and/or any other individual that is attempting to enter the tenant space.

In another example, the electronic devices include the electronic locks that are associated with the public egresses for different amenities of multi-tenant structures 130(a-n) that may include but is not limited to the pool, the parking garage, a specific garage, a parking lot, a tennis court, a basketball court, a volleyball court, a workout room, a multi-purpose room, a main entrance for multi-tenant structures 130(a-n), a main gate for multi-tenant structures 130

(a-n) and/or any other type of amenities associated with multi-tenant structures 130(a-n) that will be apparent to those skilled in the relevant art(s) without departing from the spirit and scope of the invention. The public egresses may be public in that more than one user may be granted permissions to wirelessly control the electronic locks associated with the public egresses. For example, several different tenants may be granted permissions to wirelessly control the electronic locks associated with the public egress for the pool for multi-tenant structures 130(a-n) while any individuals that are not a tenant of multi-tenant structures 130(a-n) may be prevented permissions to wirelessly control such electronic locks. In doing so, the user granted such permissions may wirelessly unlock the electronic locks to enable the doors with the different public egresses that the user has been granted permissions to wirelessly control to be unlocked thereby enabling the user to have access to the different amenities of multi-tenant structures 130(a-n).

In another example, the electronic devices include electronic devices that may be wirelessly controlled by the user when granted permissions to do so and in being granted such wireless control, enable the user to have wireless control of features associated with multi-tenant structures 130(a-n). For example, the electronic devices may include electronic devices associated with the control of the home automation features of the tenant space inhabited by the user. The home automation features may be features that may be adjusted via wireless control such that each feature may have an electronic device associated with each feature that enables the wireless control of each feature. For example, the electronic devices may include electronic devices associated with the home automation features of the tenant space that include but are not limited to the internet, thermostats, lighting, cable television, appliances, and/or any other feature associated with the home automation of the tenant space that will be apparent to those skilled in the relevant art(s) without departing from the spirit and scope of the invention. In doing so, the user granted such permissions may wirelessly control the different home automation features to adjust the corresponding home automation features as requested by the user.

As noted above, multi-tenant structures 130(a-n) may include numerous tenant spaces that is managed by a single management entity. Often times the single management entity may manage numerous multi-tenant structures 130(a-n) that are positioned in different geographic locations. With such numerous tenant spaces, the single management entity may manage numerous transactions where the occupation of the tenant space is transitioning from users that are terminating their agreement to inhabit the tenant space to users that are entering into their agreement to inhabit the tenant space. Such numerous transitions of move-ins of new users to tenant spaces with the move-outs of the previous users out of the tenant spaces may occur at increased rates as the amount of tenant spaces managed by the management entity increases.

The management entity may be required to adequately provision the permissions to wirelessly control the appropriate electronic devices to the new user as the new user first gains possession of the tenant space in that when by agreement the new user is first able to move into the tenant space. Failure to adequately provision the permissions to wirelessly control the appropriate electronic devices to the new user may prevent the new user from having the appropriate access to multi-tenant structures 130(a-n) and/or control of the features associated with multi-tenant structures 130(a-n) as provided to the new user under the agreement. For example, the failure to adequately provision a spouse of the tenant with wireless control of the electronic locks for the private egress for the tenant space may result in the spouse being locked out of the tenant space despite having been granted permissions to inhabit the tenant space via the agreement.

The management entity may also be required to adequately revoke the permissions to wirelessly control the appropriate electronic devices to the previous user that is first vacating possession of the tenant space in that when by agreement the previous user is first required to vacate the tenant space. Failure to adequately revoke the permissions to wirelessly control the appropriate electronic devices to the previous user that is vacating possession of the tenant space may provide the previous user with inappropriate access to multi-tenant structures 130(a-n) and/or control of features associated with multi-tenant structures 130(a-n) that should no longer be provided to the previous user under the termination of the agreement. For example, the failure to adequately revoke the previous user with wireless control of the electronic locks for the private egress for the tenant space may result in the previous user to continue to have access to the tenant space despite a new tenant having already moved into the tenant space.

Further, the management entity may also be required to adequately provision and/or revoke permissions associated with the wireless control of numerous electronic devices that provide numerous different types of access for each user to multi-tenant structures 130(a-n) as well as providing control to numerous different types of features for each user as provided by the agreement. For example, each user may be granted permissions to access the electronic devices associated with the private egresses of the tenant space electronic devices granting access to the pool, the parking garage, a specific garage, a parking lot, a tennis court, a basketball court, a volleyball court, a workout room, a multi-purpose room, a main entrance for multi-tenant structures 130(a-n), a main gate for multi-tenant structures 130(a-n) and/or any other type of amenities associated with multi-tenant structures 130(a-n) that a tenant and/or owner may be granted permissions to access based on the agreement that will be apparent to those skilled in the relevant art(s) without departing from the spirit and scope of the invention. Further, the electronic devices may include electronic devices associated with the home automation features of the tenant space that include but are not limited to the internet, thermostats, lighting, cable television, appliances, and/or any other feature associated with the home automation of the tenant space that will be apparent to those skilled in the relevant art(s) without departing from the spirit and scope of the invention.

Thus, the management entity may be required to adequately provision and/or revoke permissions to wirelessly control numerous electronic devices for each user that is entering into an agreement to inhabit the corresponding tenant spaces and/or are terminating an agreement to inhabit the corresponding tenant spaces. Further, the management entity may be required to do so for numerous transitions of move-ins of new users to tenant spaces with the move-outs of the user previous users out of the tenant spaces may occur at increased rates as the amount of tenant spaces managed by the management entity increases. Further, the management entity often times may be required to adequately do so for tenant spaces that are positioned in different geographic locations.

Rather than the management entity having numerous representatives on-site at each multi-tenant structure 130(a-n) to manually provision the appropriate permissions to the appropriate user upon move-in to each tenant space as well as revoke the appropriate permissions from the appropriate previous user upon move-out of each tenant space, multi-tenant computing device 110 may automatically aggregate wireless control of the appropriate electronic devices based on the permissions associated with each user. In doing so, multi-tenant computing device 110 may also automatically revoke wireless control of the appropriate electronic devices based on the terminated permission associated with each previous user. After the user has engaged in the agreement to inhabit the tenant space included in multi-tenant structures 130(*a-n*), multi-tenant computing device 110 may automatically aggregate wireless control of the appropriate electronic devices to the user based on the permissions granted to the user by the agreement. Multi-tenant computing device 110 may then automatically revoke wireless control of the appropriate electronic devices based on the permissions that are terminated upon the termination of the agreement.

Thus, multi-tenant computing device 110 may significantly decrease the complexity of the provisioning and/or revoking of the appropriate permissions by the representatives of the management entity. The representatives of the management entity no longer have to manually provision the appropriate permissions to the appropriate user upon move-in to each tenant space as well as revoke the appropriate permissions from the appropriate user upon move-out of each tenant space. Rather, multi-tenant computing device 110 may automatically aggregate the appropriate permissions to each user after each user has engaged the agreement to inhabit the tenant space included in multi-tenant structures 130(*a-n*) as well as automatically revoke the appropriate permissions to each former user upon termination of the agreement. In doing so, significantly less representatives of the management entity may be required to oversee the provisioning and/or revoking of the appropriate permissions as well as significantly decrease the risk of incorrectly provisioning and/or revoking inappropriate permissions to users and/or former users.

Rather than have numerous representatives of the management entity have to correctly provision the permissions of numerous users conducting move-ins to multi-tenant structures 130(*a-n*) as well as revoke the permissions of numerous former users upon move-outs of multi-tenant structures 130(*a-n*), multi-tenant computing device 110 may simply automatically provision the appropriate permissions to each user upon move-in as well as revoke the appropriate permissions from each former user upon move-out. Further, multi-tenant computing device 110 may automatically provision the appropriate permissions to each user that has engaged in the agreement to inhabit the tenant space as well as revoke the appropriate permissions from former users that have terminated the agreement from multi-tenant structures 130(*a-n*) that are positioned in different geographic locations thereby further decreasing the amount of representatives required to oversee the provisioning and/or revoking of the appropriate permissions.

Multi-tenant computing device 110 includes a processor, a memory, and a network interface, herein after referred to as a computing device or simply "computer". For example, multi-tenant computing device 110 may include a data information system, a data management system, web server, and/or file transfer server. Multi-tenant computing device 110 may also be a workstation, mobile device, computer, cluster of computers, set-top box, a cloud server or other computing device.

In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display.

Tenant communications device 140 may enable the user to wirelessly control each of the electronic devices based on the permissions aggregated to tenant communications device 140 from multi-tenant computing device 110. After multi-tenant computing device 110 has automatically aggregated the appropriate permissions to the user to wirelessly control the appropriate electronic devices, multi-tenant computing device 110 may aggregate such appropriate permissions to tenant communications device 140 to thereby enable the user to wirelessly control each electronic device via tenant communications device 140. In doing so, the user may easily control each of the electronic devices wirelessly via tenant communications device 140.

For example, the user may unlock and/or lock the electronic locks associated with the primary egresses of the tenant space that multi-tenant computing device 110 has aggregated such permissions to the user to wirelessly control via tenant communications device 140. Each user associated with the tenant space and granted permissions to wirelessly control different electronic devices based on the agreement to inhabit the tenant space may do so via each corresponding tenant communications device 140 for each user. In another example, the spouse of the user may wirelessly control the electronic locks associated with the primary egresses of the tenant space to lock and/or unlock the electronic locks based on the permissions granted to the spouse via the agreement via the corresponding tenant communications device 140 for the spouse. In doing so, both the user and the spouse may wirelessly control the electronic locks of the primary egresses via their own individual tenant communications devices 140 as granted permissions to do so from multi-tenant computing device 110.

Examples of multi-tenant computing device 110 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the invention.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

User interface 170 may include any type of display device including but not limited to a touch screen display, a liquid crystal display (LCD) screen, and/or any other type of display device that includes a display that will be apparent from those skilled in the relevant art(s) without departing from the spirit and scope of the present disclosure.

As shown, the appropriate permissions to the appropriate electronic devices as well as the wireless control of the electronic devices may be streamed between numerous use communications devices 140 and multi-tenant computing device 110 via network 180. Network 180 includes one or more networks, such as the Internet. In some embodiments of the present disclosure, network 180 may include one or more wide area networks (WAN) or local area networks (LAN). Network 180 may utilize one or more network technologies such as Ethernet, Fast Ethernet, Gigabit Ethernet, virtual private network (VPN), remote VPN access, a variant of IEEE 802.11 standard such as Wi-Fi, and the like. Communication over network 180 takes place using one or more network communication protocols including reliable streaming protocols such as transmission control protocol (TCP). Each of the numerous tenant communications devices 140 may interface with multi-tenant computing device 110 via network 180 through an application programming interface (API), web interface and/or any other type of interface that will be apparent from those skilled in the relevant art(s) without departing from the spirit and scope of the present disclosure. These examples are illustrative and not intended to limit the present disclosure.

Automatic Aggregation of Wireless Control of Electronic Devices

As noted above, multi-tenant computing device 110 may automatically aggregate wireless control of electronic devices associated with multi-tenant structures 130(*a-n*) to enable a user to engage in wireless control of the electronic devices associated with permissions granted to the user. In doing so, multi-tenant computing device 110 may identify the electronic devices associated with multi-tenant structures 130(*a-n*) that are under wireless control. Multi-tenant computing device 110 may then determine the electronic devices that the user may be provided wireless control of based on the permissions granted to the user. Multi-tenant computing device 110 may then aggregate the wireless control of the electronic devices to the user based on the permissions granted to the user.

One such implementation of aggregating wireless control is illustrated in process 200 in FIG. 2. Process 200 includes three primary steps: identify electronic devices associated with multi-tenant structures 130(*a-n*) that are under wireless control 210, determine partitioned electronic devices to provide the user with wireless control of based on associated granted permissions 220, aggregate wireless control of the partitioned electronic devices to the user that correspond to the associated permissions granted to the user 230, and determine and aggregate wireless control of the partitioned electronic devices based on the hierarchy of permissions that is granted to each supervisory user. Steps 210-240 are typically implemented in a computer, e.g., via software and/or hardware, e.g., multi-tenant computing device 110.

In step 210, multi-tenant computing device 110 may identify the electronic devices associated with multi-tenant structures 130(*a-n*) that are under wireless control based on a unique identifier associated with each of the electronic devices. Each unique identifier associated with each of the electronic devices enables each of the electronic devices to be engaged via wireless control. Each electronic device associated with multi-tenant structures 130(*a-n*) that is capable of being wirelessly controlled has a corresponding unique identifier. Multi-tenant computing device 110 may then identify the electronic devices associated with multi-tenant structures 130(*a-n*) that may have wireless control aggregated to the user based on the unique identifiers. Electronic devices without unique identifiers that are recognized by multi-tenant computing device 110 may be bypassed by multi-tenant computing device 110 as electronic devices that are not under wireless control. Multi-tenant computing device 110 may store each unique identifier associated with each electronic device in electronic devices database 120. In an example embodiment, step 210 may be performed by processor 115 of multi-tenant computing device 110.

After the electronic devices that are under wireless control are identified, in step 210, multi-tenant computing device 110 may determine a plurality of partitioned electronic devices to provide the user with wireless control on associated granted permissions. Multi-tenant computing device 110 may determine a plurality of partitioned electronic devices to provide the user with wireless control of the partitioned electronics devices based on associated permissions granted to the user. The partitioned electronic devices are a set of electronic devices included in the plurality of electronic devices that have the associated permissions granting wireless control of the partitioned electronic devices to the user.

As noted above multi-tenant computing device 110 may identify the electronic devices that are under wireless control based on electric devices that have unique identifiers associated with each that are identifiable by multi-tenant computing device 110. From the electronic devices that are under wireless control as identified by multi-tenant computing device 110, multi-tenant computing device 110 may then determine the partitioned electronic devices from the electronic devices that are under wireless control that the user may be provided wireless control of the partitioned electronic devices. Rather than have numerous representatives of the management entity to correctly determine the numerous users to receive wireless control of the partitioned electronic devices that each user is to be granted wireless control of, multi-tenant computing device 110 may simply automatically determine the partitioned electronic devices that each user is to have wireless control. As noted above, each user may have wireless control over a different set of partitioned electronic devices and any incorrect provisioning by the numerous representatives of the management entity may deny the user the appropriate wireless control. However, multi-tenant computing device 110 may automatically determine the partitioned electronic devices for each user without requiring the intervention of the representatives of the management entity.

For example, multi-tenant computing device 110 may enable the property manager of multi-tenant structures 130(*a-n*) to electronically on-board and/or off-board the users rather than having to manually provision and/or revoke the wireless control of the partitioned electronic devices for each user. In doing so, each user upon move-in may have immediate access to the user services granted to each user in inhabiting each corresponding tenant space included in multi-tenant structures 130(*a-n*) as granted by the agreement between each user and the owner of multi-tenant structures 130(*a-n*).

The services granted to the user inhabiting each corresponding tenant space such that user is granted wireless control of each partitioned electronic device includes access via the electronic devices associated with the pool, the parking garage, a specific garage, a parking lot, a tennis court, a basketball court, a volleyball court, a workout room, a multi-purpose room, a main entrance for multi-tenant structures 130(*a-n*), a main gate for multi-tenant structures 130(*a-n*) and/or any other type of amenities associated with multi-tenant structures 130(*a-n*) that a tenant and/or owner may be granted permissions to access based on the agreement that will be apparent to those skilled in the relevant art(s) without departing from the spirit and scope of the invention. Other partitioned electronic devices that the user may be granted wireless control of include but are not limited to the electronic locks associated with private egresses of the tenant space inhabited by the user as well as the home automation features of the tenant space that include but are not limited to the internet, thermostats, lighting, cable television, appliances, and/or any other feature associated with the home automation of the tenant space that will be apparent to those skilled in the relevant art(s) without departing from the spirit and scope of the invention. Other partitioned electronic devices that the user may be granted wireless control of include cameras positioned throughout multi-tenant structure that the user may have access to the video feeds captured by each of the cameras that the user has wireless control of and/or any other partitioned electronic device associated with multi-tenant structures 130(a-n) that the user may have wireless control of that will be apparent to those skilled in the relevant art(s) without departing from the spirit and scope of the invention.

In an embodiment, multi-tenant computing device 110 may access an application programming interface (API) of multi-tenant structures 130(a-n) via network 180. As each user signs the agreement to inhabit a corresponding tenant space included in multi-tenant structures 130(a-n), user data associated with each user is automatically streamed by multi-tenant computing device 110 from the API of multi-tenant structures 130(a-n). User data is data associated with the user that uniquely identifies the user such that multi-tenant computing device 110 may correctly grant wireless control to the partitioned electronic devices that the agreement to inhabit the tenant space included in multi-tenant structures 130(a-n) grants to the user. For example, user data includes but is not limited to the name of the user, social security number of the user, the mobile phone number associated with the communications device that the user requests to conduct the wireless control of the partitioned electronic devices, the address of the tenant space, and/or any other user data associated with the user that uniquely identifies the user such that multi-tenant computing device 110 may correctly grant the wireless control to the partitioned electronic devices to the user that will be apparent to those skilled in the relevant art(s) without departing from the spirit and scope of the invention.

In doing so, multi-tenant computing device 110 may automatically determine the partitioned electronic devices that each user is to be granted wireless control of based on the user data associated with the user that is provided to multi-tenant computing device 110 once the user signs the agreement. By accessing the API of multi-tenant structures 130(a-n), multi-tenant computing device 110 may automatically stream the user data for the numerous users as each user signs the numerous agreements that are entering into numerous agreements to inhabit numerous tenant spaces included in multi-tenant structures 130(a-n) thereby enabling multi-tenant computing device 110 to automatically determine the partitioned electronic devices that each of the numerous users is to be granted wireless control. In an embodiment, multi-tenant computing device 110 may access numerous APIs associated with multi-tenant structures 130(a-n) and/or numerous other multi-tenant structures managed by different management entities and positioned in different geographic locations simultaneously. In doing so, multi-tenant computing device 110 may determine the partitioned electronic devices that each user is to be granted wireless control of from the user data streamed to multi-tenant computing device 110 from the numerous APIs.

For example, multi-tenant computing device 110 may determine a first plurality of partitioned electronic devices to provide a first user with wireless control based on a first set of associated permissions granted to the first user and a second plurality of partitioned electronic devices to provide a second user with wireless control based on a second set of associated permissions granted to the second user. The first set of associated permissions differ from the second set of associated permissions. Each of the numerous users that inhabit tenant spaces includes in multi-tenant structures 130(a-n) may have different partitioned electronic devices that each of the numerous users may have wireless control. In such an example, each of the numerous users may have wireless control of the electronic locks associated with the private egresses of each tenant space occupied by each user while being denied wireless control of the electronic locks associated with the tenant spaces not occupied by each user as well as the electronic devices associated with the home automation of each tenant space and so on. As each of the numerous users enter into the corresponding agreements, multi-tenant computing device 110 may determine from the user data associated with each of the numerous users as streamed from the API of multi-tenant structures 130(a-n), partitioned electronic devices to provide wireless control to each corresponding user as the partitioned electronic devices that user is granted wireless control of differs.

Multi-tenant computing device 110 may also determine different pluralities of unit devices to provide a plurality of users with wireless control of each corresponding plurality of unit devices based on access to a corresponding unit of multi-tenant structures 130(a-n) that each corresponding user has. Each plurality of unit devices is associated with a corresponding unit included in multi-tenant structures 130(a-n). As noted above, multi-tenant computing device 110 may determine the partitioned electronic devices that each user is to be granted wireless control. The partitioned electronic devices may include unit devices such that the unit devices are associated with the tenant space that the user has entered into an agreement to inhabit. The unit devices associated with the tenant space may be the electronic devices included in the tenant space that only the user that is inhabiting the tenant space is to have wireless control of and any user that is not inhabiting the tenant space is not granted wireless control of the unit devices associated with the tenant space. The unit devices included in the tenant space may include but not limited to the electronic locks to the main egress of the tenant space, electronic locks to any sliding doors and/or windows of the tenant space, as well as the electronic devise included in the home automation system for the tenant space such as but not limited to thermostats, appliances, television, and so on. In an example embodiment, step 220 may be performed by processor 115 of multi-tenant computing device 110.

After the partitioned electronic devices to provide the user with wireless control of are determined, in step 230, multi-tenant computing device 110 may aggregate wireless control of the partitioned electronic devices to the user that correspond to the associated permissions granted to the user. Multi-tenant computing device 110 may aggregate wireless control of the partitioned electronic devices to the user with unique identifiers that correspond to the associated permissions granted to the user. The associated permissions granted to the user enable the user to have wireless control over the partitioned electronic devices with the associated permissions and prevent the user from having wireless control of the electronic devices that do not have the associated permissions.

As noted above, each user may be granted associated permissions with regard to the wireless control of the partitioned electronic devices that each user may be granted based on the agreement for each user to inhabit the corresponding tenant space. As each user enters into the agreement, multi-tenant computing device 110 may also stream the associated permissions with regard to the wireless control of the partitioned electronic devices that each user may have wireless control via the API of multi-tenant structures 130(*a*-*n*) and store such associated permissions in electronic device database 120 for each user. In doing so, multi-tenant computing device 110 may automatically aggregate wireless control to the appropriate partitioned electronic devices for each user based on the associated permissions for each user that grants each user such wireless control of the appropriate partitioned electronic devices.

As noted above, multi-tenant computing device 110 may store each unique identifier for each electronic device included in multi-tenant structures 130(*a*-*n*) that may be wirelessly controlled in electronic device database 120. As multi-tenant computing device 110 streams user data as well as the associated permissions for the user entering into an agreement to inhabit the corresponding tenant space included in multi-tenant structures 130(*a*-*n*), multi-tenant computing device 110 may determine the unique identifier of each partitioned electronic device that corresponds to the associated permissions granted to the user to wirelessly control each partitioned electronic device. Multi-tenant computing device 110 may then aggregate wireless control to each partitioned electronic device based on the unique identifier associated with each partitioned electronic device that the user is granted permission to wirelessly control based on the associated permissions.

Multi-tenant computing device 110 may also stream via the API of multi-tenant structures 130(*a*-*n*) the associated date to aggregate the wireless control to the user of the partitioned electronic devices that the user has been granted associated permissions. Often times after the user has entered into the agreement to inhabit the tenant space included in multi-tenant structures 130(*a*-*n*), a period lapses between entering into the agreement and the move-in date in which the user takes possession of the tenant space. Multi-tenant computing device 110 may refrain from aggregating the wireless control to the user of the partitioned electronic devices that the user has been granted associated permissions until the date that the user is to take possession of the tenant space. Multi-tenant computing device 110 may also store the move-in date in electronic device database 120 and then automatically aggregate the wireless control to the user of the partitioned electronic devices that the user has been granted associated permissions on the move-in date thereby automatically enabling the user to have wireless control of the partitioned electronic devices upon taking possession of the tenant space.

For example, the user may enter into an agreement to lease Apartment Unit #502 included in multi-tenant structures 130(*a*-*n*) on Jan. 13, 2018. Multi-tenant computing device 110 may then automatically stream the appropriate user data and the associated permissions granted to the user via the agreement from the API of multi-tenant computing device 110 and store the user data and associated permissions in electronic device database 120. However, the user may not take possession of the Apartment Unit #502 until Feb. 13, 2018. The move-in date of Feb. 13, 2018 may automatically be streamed by multi-tenant computing device 110 from the API of multi-tenant structures 130(*a*-*n*) and stored in electronic device database 120. On Feb. 13, 2018, multi-tenant computing device 110 may then determine each unique identifier associated with each partitioned electronic device that the user has been granted associated permissions as stored in electronic device database 120. Multi-tenant computing device 110 may then automatically aggregate wireless control of the partitioned electronic devices that the user has been granted the associated permissions to the user Feb. 13, 2018 based on the unique identifiers associated with each of the partitioned electronic devices that the user has been granted the associated permissions.

Multi-tenant computing device 110 may also prevent the user from having wireless control of the electronic devices that do not have the associated permissions for the user to wirelessly control. For example, multi-tenant computing device 110 may aggregate wireless control of the first plurality of partitioned electronic devices to the first user based on the first set of associated permissions granted to the first user and wireless control of the second plurality of partitioned electronic devices to the second user based on the second set of associated permissions granted to the second user. The wireless control of the first plurality of electronic devices by the first user is simultaneous with the wireless control of the second plurality of electronic devices by the second user. In doing so, multi-tenant computing device 110 may prevent the first user from having wireless control of the electronic devices that the first user does not have associated permissions to wirelessly control while also preventing the second user from having wireless control of the electronic devices that the second user does not have associated permissions to wirelessly control. However, both the first user may have wireless control over the first plurality of electronic devices simultaneously with the wireless control of the second user over the second plurality of electronic devices.

Multi-tenant computing device 110 may also aggregate wireless control of common electronic devices that are accessible to various different tenants of multi-tenant structures 130(*a*-*n*) to each of the different tenants that may have wireless access over such common electronic devices. For example, multi-tenant computing device 110 may aggregate wireless control of a plurality of common electronic devices to the first user and the second user based on the first set of associated permission granted to the first user and the second set of permissions granted to the second user. The plurality of common electronic devices is accessible to the first user and the second user. There are various electronic devices associated with multi-tenant structures 130(*a*-*n*) that may be accessible to numerous if not all tenants of multi-tenant structures 130(*a*-*n*).

For example, numerous tenants may have access through the main egress of multi-tenant structures 130(*a*-*n*) in order to gain access to the multi-tenant structures 130(*a*-*n*) and/or may have access to the pool associated with multi-tenant structures 130(*a*-*n*). In such an example, each of the various users may have be granted permissions to engage the electronic locks associated with the main egress of multi-tenant structures 130(*a*-*n*) and the pool associated with multi-tenant structures 130(*a*-*n*) to successfully transfer the electronic locks via each tenant communications device 140 for each user. In doing so, multi-tenant computing device 110 may determine from the user data streamed from the API of multi-tenant structures 130(*a*-*n*) the permissions that each user may be granted with regard to having wireless access control over common electronic devices associated with multi-tenant structures 130(*a*-*n*). Multi-tenant computing device 110 may then grant the appropriate permissions to each of the various users that may have wireless control over the common electronic devices such that each of the various users may have wireless control over the common electronic devices.

Multi-tenant computing device 110 may also transfer wireless control of the first plurality of partitioned electronic devices from the first user to a third user when the first set of associated permissions initially granted to the first user is terminated and the third user is granted the first set of associated permissions to have wireless control of the first plurality of partitioned electronic devices. As noted above, multi-tenant computing device 110 may enable representatives of multi-tenant structures 130(*a-n*) to easily transfer the permissions of wireless control of different electronic devices as each of numerous users terminate their agreements to inhabit the corresponding tenant spaces to the numerous users which then enter agreements to inhabit the vacated tenant spaces. In doing so, multi-tenant computing device 110 may upon streaming the user data from the API of multi-tenant structures 130(*a-n*) and determining that different users are to vacate tenant spaces on a specific date while other users are to inhabit the tenant spaces on a specific date, automatically transfer the associated permissions of the appropriate electronic devices for the users vacating the tenant spaces to the users that are inhabiting the vacated tenant spaces.

Multi-tenant computing device 110 may also aggregate wireless control of a service template associated with each partitioned electronic device for the user to have wireless control of each partitioned electronic device based on the service template associated with each partitioned electronic device. The service template associated with each partitioned electronic device provides a plurality of features that the user has wireless control of for each corresponding partitioned electronic device. For each electronic device that is partitioned to the user as the user having wireless control over each partitioned electronic device, such wireless control of each partitioned electronic device aggregated to the user is based on the service template associated with each partitioned electronic device. Multi-tenant computing device 110 may first identify the service template associated with each partitioned electronic device based on the unique identifier associated with each partitioned electronic device. Multi-tenant computing device 110 may then aggregate wireless control of the service template of each partitioned electronic device to the user.

In doing so, the user may have wireless control over the features of the partitioned electronic device that are provided in the service template associated with the partitioned electronic device and may adjust those features as provided by the service template. Any feature that is not provided in the service template may not be adjusted by the user. For example, multi-tenant computing device 110 may aggregate wireless control of the features included in the service template for the thermostat associated with the tenant space that the user has entered into an agreement to inhabit. The service template associated with the thermostat may include the features of adjusting the temperature of the thermostat such that the temperature may be increased and/or decreased as well as the activating and/or deactivating the thermostat. As a result, multi-tenant computing device 110 may aggregate wireless control of the features included in the service template associated with the thermostat such that the user may increase and/or decrease the temperature of the thermostat as well as activate and/or deactivate the thermostat.

Multi-tenant computing device 110 may also aggregate wireless control of each plurality of unit devices to each corresponding user with unique identifiers that correspond to the corresponding unit of multi-tenant structures 130(*a-n*) with unique identifiers that correspond to the corresponding unit of multi-tenant structures 130(*a-n*) that each corresponding user has access. Each corresponding user has wireless control of the plurality of unit devices associated with the unit of multi-tenant structures 130(*a-n*) that each corresponding user has access and is prevented from having wireless control of the pluralities of unit devices that are associated with units of multi-tenant structures 130(*a-n*) that the user does not have access. As noted above, the unit devices may be the partitioned electronic devices that multi-tenant computing device 110 has aggregated wireless control to the user that are associated with the tenant space inhabited by the user. Multi-tenant computing device 110 may aggregate such wireless control to the user based on the unique identifiers of the unit devices that are included in the tenant space based on the unique identifiers of the unit devices while prohibiting other users that are not inhabiting the tenant space from having such wireless control. In an example embodiment, step 230 may be performed by processor 115 of multi-tenant computing device 110.

In step 240, multi-tenant computing device 110 may determine and aggregate wireless control of the partitioned electronic devices based on the hierarchy of permissions that is granted to each supervisory user. As discussed in detail above, multi-tenant computing device 110 may determine and aggregate wireless control of the partitioned electronic devices to each user based on the permissions granted to each user. However, in addition to determining and aggregating wireless control for each user, multi-tenant computing device 110 may also determine and aggregate wireless control of electronic devices based on the hierarchy of permission grated to each supervisory user. In doing so, multi-tenant computing device 110 may determine and aggregate wireless control of numerous electronic devices in that the wireless control of those numerous electronic devices have that have already been aggregated to different individual users to supervisory users. The supervisory users may then have wireless control of the electronic devices that the wireless control has been aggregated to different individual users such that each supervisory user may have the wireless control of the electronic devices granted to numerous users in addition to the wireless control already granted to the different users.

For example, multi-tenant computing device 110 may determine a plurality of units of multi-tenant structures 130(*a-n*) that a supervisory user is to be granted wireless control of each plurality of unit devices associated with the plurality of units. The supervisory user is a user that oversees each user that has access to each corresponding unit included in the plurality of units of multi-tenant structures 130(*a-n*). Multi-tenant computing device 110 may aggregate wireless control of each plurality of unit devices associated with the plurality of units of multi-tenant structures 130(*a-n*) to the supervisory user. The supervisory user has wireless control of each plurality of unit devices that supersedes the wireless control of each corresponding plurality of unit devices that each user is granted.

In doing so, multi-tenant computing device 110 may determine and aggregate the wireless control of the numerous unit devices associated with numerous different tenant spaces to the supervisory user based on a hierarchy of permissions in that multi-tenant computing device 110 may hierarchal nest the permissions for each supervisory user and then aggregate the wireless control of the appropriate unit devices associated with the appropriate tenant spaces to the supervisory user based on the hierarchal nest of permissions. For example, each of multi-tenant structures 130(*a-n*) may have a supervisory user in a property manager that is associated with each of the different multi-tenant structures 130(*a-n*) such that multi-tenant structure 130*a* may have a first property manager and multi-tenant structure 130*b* may have a second property manager and multi-tenant structures 130n may have a third property manager and so on.

Multi-tenant computing device 110 may determine and aggregate the wireless control of the numerous unit devices associated with the different tenant spaces included in multi-tenant structures 130(a-n) to each of the different property managers such that each property manager may have wireless control of the unit devise included in the multi-tenant structures 130(a-n) that each corresponding property manager is associated. In such an example, multi-tenant computing device 110 may determine and aggregate wireless control of each of the numerous unit devices for each of the different tenant spaces included in multi-tenant structure 130a to the first property manager such that the first property manager has wireless control of each of the different unit spaces in addition to each individual user having wireless control of the unit devices included in the tenant space inhabited by each individual user. Multi-tenant computing device 110 may determine and aggregate wireless control of each of the numerous unit devices of the different tenant spaces included in multi-tenant structure 130b to the second property manager such that the second property manager has wireless control of each of the different unit spaces in addition to each individual user having wireless control of the unit devices included in the tenant space inhabited by each individual user. Multi-tenant computing device 110 may determine and aggregate wireless control of each of the numerous user unit devices of the different tenant spaces included in multi-tenant structure 130n to the third property manager such that the third property manager has wireless control of each of the different unit spaces in addition to each individual user having wireless control of the unit devices include in the tenant space inhabited by each individual user and so on.

As noted above, multi-tenant structures 130(a-n) may include numerous tenant structures each with numerous tenant spaces with numerous tenants inhabiting those numerous tenant spaces as well as each of the numerous tenant structures being positioned in numerous different geographic locations. As a result, multi-tenant structures 130(a-n) may not only have numerous different users inhabiting numerous tenant spaces but may also have numerous different supervisor users with each supervisor user having permissions granted to have wireless control numerous different unit devices associated with numerous different tenant spaces. In addition to the example above where each multi-tenant structure 130(a-n) may have a corresponding property manager is granted permissions to have wireless control of the unit devices associated with the tenant spaces of each multi-tenant structure 130(a-n), additional supervisor users that have responsibility to manage numerous different multi-tenant structures 130(a-n). Rather than a single multi-tenant structure 130(a-n) as for the property managers, the additional supervisor users may require wireless control of the unit devices associated with the tenant spaces included in the numerous multi-tenant structures 130(a-n).

For example, multi-tenant structures 130(a-n) may include numerous tenant structures such that not only does each individual tenant structure 130(a-n) have a property manager associated with each individual tenant structure 130(a-n), each group of tenant structures 130(a-n) may have a regional manager associated with each group of tenant structures such that each regional manager is responsible for tenant structures 130(a-n) included in the group of the regional manager. In such an example, multi-tenant computing device 110 may determine and aggregate wireless control to each of the unit devices included in each of the tenant spaces included in each of the tenant structures 130(a-n) included in the group of tenant structures 130(a-n) that each regional manager is responsible for. Such wireless control aggregated to each regional manager may be in addition to the wireless control aggregated to each property manager of the unit devices for the tenant spaces included in the individual tenant structure 130(a-n) that each property manager is responsible for and in addition to the wireless control aggregated to each individual user of the unit devices for the individual tenant space inhabited by each individual user.

Multi-tenant computing device 110 may automatically determine and aggregate the wireless control of the unit devices to each different supervisory user regardless of the amount of unit devices and/or tenant spaces and/or tenant structures 130(a-n) that each supervisory user is responsible for and in turn has permissions to have wireless control of the unit devices included in each based on the hierarchal nesting. In doing so, multi-tenant computing device 110 may determine the different silos of tenant spaces that each supervisory user is responsible for whether be the tenant spaces in a single tenant structure 130(a-n) for a property manager and/or numerous different tenant structures 130(a-n) for a regional manager and so on. Then based on the different silos of tenant spaces determined for each supervisory user, multi-tenant computing device 110 may automatically determine and then aggregate wireless control of the unit devices to each supervisory user based on the tenant spaces included in each silo for each supervisory user as determined by multi-tenant computing device 110.

For example, multi-tenant computing device 110 may determine the plurality of units of the multi-tenant structure 130(a-n) that the supervisory user is to be granted wireless control of each plurality of unit devices associated with the plurality of units based on a geographic location of each unit. Each supervisory user oversees each unit positioned within the geographic location. Multi-tenant computing device 110 may aggregate wireless control of each plurality of unit devices associated with the plurality of units positioned in the geographic location to the supervisory user. The supervisory user has wireless control of each plurality of unit devices associated with the plurality of units positioned in the geographic location and is prevented from having wireless control of each plurality of unit devices associated with a plurality of units not positioned in the geographic location.

In such an example, multi-tenant computing device 110 may automatically determine and aggregate wireless control of the unit devices to each supervisory user based on whether the unit devices are associated with tenant spaces within a geographic location that is assigned to each supervisory user. In doing so, multi-tenant computing device 110 may determine the silo of unit devices that each supervisory user is to be granted wireless control of based on the geographic location of the tenant spaces included in the geographic location assigned to each supervisory user. In such an example, the geographic location assigned to each supervisory user may differ in hierarchy in that the property manager may be assigned a geographic location of a single tenant structure 130(a-n) when a regional manager may be assigned a geographic location of a radius that includes each tenant structure located within the radius of the geographic location assigned to the regional manager.

Multi-tenant computing device 110 may determine and aggregate wireless control of unit devices to each supervisory user based on the silo generated for each supervisory user that may be based on geographic location of the tenant spaces, the type of tenant spaces, the authority of the supervisory user, and/or any other type of determination that may determine the unit devices that each supervisory user is to be granted wireless control that will be apparent to those skilled in the relevant art(s) without departing from the spirit and scope of the present disclosure. In an example embodiment, step 240 may be performed by processor 115 of multi-tenant computing device 110.

Wireless Control of Electronic Devices

As noted above, multi-tenant computing device 110 may automatically aggregate wireless control of electronic devices associated with multi-tenant structures 130(*a-n*) to enable a user to engage in wireless control of the electronic devices associated with permissions granted to the user. In doing so, multi-tenant computing device 110 may identify the electronic devices associated with multi-tenant structures 130(*a-n*) that are under wireless control. Multi-tenant computing device 110 may then determine the electronic devices that the user may be provided wireless control of based on the permissions granted to the user. Multi-tenant computing device 110 may then aggregate the wireless control of the electronic devices to the user based on the permissions granted to the user.

After multi-tenant computing device 110 has aggregated the wireless control of the electronic devices to the user, the user may engage in the aggregated wireless control of the electronic devices with tenant communications device 140 that is associated with the user. In aggregating the wireless control of the electronic devices to the user, multi-tenant computing device 110 may aggregate the wireless control of the electronic devices to tenant communications device 140 that is associated with the user such that the user may then wirelessly control the electronic devices via tenant communications device 140. Thus, after the user has gained possession of the tenant space, the multi-tenant computing device 110 may automatically aggregate the wireless control of the electronic devices that the user is granted permissions based on the agreement to inhabit the tenant space to tenant communications device 110 such that the user may then have wireless control of the electronic devices upon gaining possession of the tenant space.

The electronic devices that the user may wirelessly control via tenant communications device 140 may include the electronic devices that are unique to the tenant space that the user is inhabiting such that the wireless control of those electronic devices may further enhance the experience of the user inhabiting the tenant space. Rather than simply manually engaging the electronic devices to adjust the electronic devices as requested by the user, the user may wirelessly adjust the electronic devices with tenant communications device 140. For example, rather than having to walk to the light switch that the user requests to turn on and then manually transitioning the light switch to increase the intensity of the light bulb associated with the light switch to brighten the light bulb, the user may wirelessly increase the intensity of the light to brighten the light bulb via tenant communications device 140. In doing so, the experience of the user in inhabiting the tenant space is further enhanced with the ease in adjusting the intensity of the light bulb with the wireless control provided by tenant communications device 140. The electronic devices that the user may have wireless control of via tenant communications device 140 may include closed circuit cameras 310, electronic devices associated with access control 320, electronic devices associated with home automation 330, and/or any other electronic device that the user is granted permission to wirelessly control that will be apparent to those skilled in the relevant art(s) without departing from the spirit and scope of the present disclosure.

Figure 3:
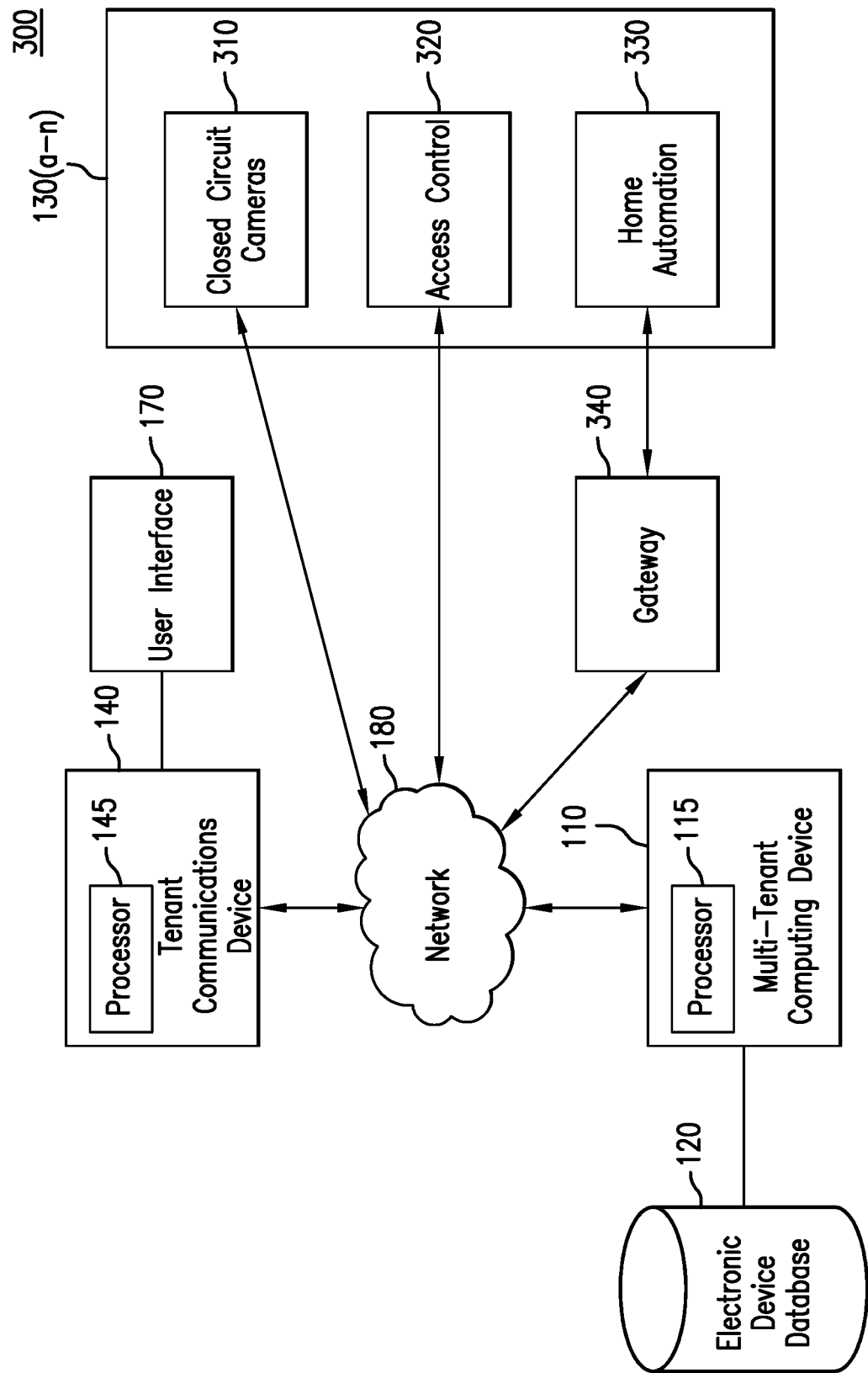
FIG. 3 shows an illustration of a multi-tenant structure control system that depicts the different electronic devices that are wirelessly controlled.

As shown in FIG. 3, a multi-tenant structure control system 300 includes multi-tenant computing device 110, electronic device database 120, tenant communications devices 140, user interface 170, network 180, and multi-tenant structures 130(*a-n*). Multi-tenant structures 130(*a-n*) include examples of different electronic devices that may be wirelessly controlled by the user via tenant communications device 140 and include but are not limited to closed circuit cameras 310, access control 320, and home automation 330. Multi-tenant structure control system 300 shares many similar features with multi-tenant structure control system 100; therefore, only the differences between multi-tenant structure control system 300 and multi-tenant structure control system 100 are to be discussed in further detail.

Multi-tenant computing device 110 may aggregate wireless control of electronic devices associated with access control 320 to tenant communications device 140 such that the user may wirelessly control the electronic devices associated with access control 320 for the tenant space that the user is inhabiting. For example, the electronic devices associated with access control 320 may include electronic locks that are associated with the private egress for each tenant space included in multi-tenant structures 130(*a-n*). As noted above, the tenant space then has electronic locks associated with each private egress that enables the user to enter and/or prevent other individuals from entering the specific tenant space that may be wirelessly controlled by the user via tenant communications device 140. In doing so, the user may wirelessly lock and/or unlock the electronic locks via tenant communications device 140 to enable the doors associated with the different private egresses to be locked and/or unlocked thereby enabling the user to regulate the access of themselves and/or any other individual that is attempting to enter the tenant space.

In another example, the electronic devices associated with access control 320 include the electronic locks that are associated with the public egresses for different amenities of multi-tenant structures 130(*a-n*) that may include but is not limited to the pool, the parking garage, a specific garage, a parking lot, a tennis court, a basketball court, a volleyball court, a workout room, a multi-purpose room, a main entrance for multi-tenant structures 130(*a-n*), a main gate for multi-tenant structures 130(*a-n*) and/or any other type of amenities associated with multi-tenant structures 130(*a-n*) that will be apparent to those skilled in the relevant art(s) without departing from the spirit and scope of the invention. In doing so, the user granted such permissions may wirelessly via tenant communications device 140 unlock the electronic locks to enable the doors with the different public egresses that the user has been granted permissions to wirelessly control to be unlocked thereby enabling the user to have access to the different amenities of multi-tenant structures 130(*a-n*).

The electronic devices associated with access control 320 that multi-tenant computing device 110 may grant wireless control of to the user such that the user may wirelessly control via tenant communications device 140 may include but is not limited to door closers, door operators, auto-operators, credential readers, hotspot readers, electronic locks including mortise, cylindrical, and/or tabular locks, exit devices, panic bars, wireless reader interfaces, gateway devices, plug-in devices, peripheral devices, doorbell camera systems, door closer control surveillance systems and/or any other type of access control device that regulates access control to private and/or public egresses associated with the tenant space and/or multi-tenant structures 130(a-n) that the user is granted permissions to wirelessly control a space that will be apparent to those skilled in the relevant art(s) without departing from the spirit and scope of the disclosure.

As noted above, multi-tenant computing device 110 may access the APIs for each of multi-tenant structures 130(a-n) via network 180 and may then stream the user data associated with each user that is to be granted permissions to wirelessly engage the appropriate electronic devices via tenant communications device 140. Multi-tenant computing device 110 may then grant the wireless control of the appropriate electronic devices to the user such that the user may wirelessly control via tenant communications device 140. In addition to accessing the APIs for each multi-tenant structure 130(a-n), in an embodiment multi-tenant computing device 110 may also access the API for each electronic device associated with access control 320 that the user is granted permissions to wirelessly control via tenant communications device 140.

In doing so, multi-tenant computing device 130(a-n) identifies each electronic device associated with access control 320 that the user is granted permissions to wirelessly control via tenant communications device 140 based on the unique identifier associated with each electronic device of access control 320 that the user is granted permissions to wirelessly control. Multi-tenant computing device 130(a-n) may then stream the user data and the unique identifier of tenant communications device 140 to each API of each electronic device of access control 320 thereby instructing via the API of each respective electronic device of access control 320 to enable the user to wirelessly control via tenant communications device 140.

In doing so, multi-tenant computing device 110 may establish a conduit with each respective electronic device of access control 320 and establish a conduit between multi-tenant computing device 110 and each respective electronic device of access control 320 such that multi-tenant computing device 110 may control the data that is streamed to each API of each respective electronic device of access control 320. Multi-tenant computing device 110 may then establish a conduit between tenant communications device 140 and each API of each respective electronic device of access control 320 that tenant communications device 140 has been granted permissions to wirelessly control The user may then wirelessly control each electronic device of access control 320 that the user has permissions to wirelessly control with tenant communications device 140 as the API of each electronic device of access control 320 has been instructed to enable wireless control via tenant communications device 140 by multi-tenant computing device 130(a-n).

In an embodiment, tenant communications device 140 may have direct wireless control of each electronic device of access control 320 that tenant communications device 140 that has wireless control aggregated by multi-tenant computing device 110. In such an embodiment, tenant communications device 140 may wirelessly communicate via the Long Term Evolution (LTE) wireless standard. Each electronic device of access control 320 may include an LTE chip that enables tenant communications device 140 to wirelessly engage and wirelessly control each corresponding electronic device of access control 320 that tenant communications device 140 has wireless control. On each side of the frequency spectrum of LTE exists a narrow band spectrum with decreased capacity as compared to the increased capacity of LTE that is Narrow Band IoT (NBIoT). The NBIoT spectrum positioned on each side of the frequency spectrum of LTE in having decreased capacity as compared to the increased capacity of LTE may have decreased cost to connect the NBIoT spectrum of each electronic device to network 180. Thus, each electronic device of access control 320 that includes the LTE chip may connect to network 180 via NBIoT spectrum with decreased cost. For example, each electronic device of access control 320 may connect to network 180 via NBIoT spectrum for $5 a month.

In doing so, tenant communications device 140 may wirelessly control each respective electronic device of access control 320 that tenant communications device 140 has been aggregated wireless control of via the NBIoT spectrum. Although the NBIoT spectrum may have decreased capacity as compared to the increased capacity of LTE, the decreased capacity of the NBIoT spectrum may be sufficient for tenant communications device 140 to adequately wirelessly control each respective electronic device of access control 320. Tenant communications device 140 simply needs to instruct each respective electronic device of access control that tenant communications device 140 has been aggregated wireless control to transition between the locked or unlocked state as well as get a status update as to the current state that each respective electronic device is in whether that be the locked or unlocked state. The decreased capacity of the NBIoT spectrum may be sufficient to enable tenant communications device 140 request a status of each respective electronic lock of access control 320 every 1.0 second as well as instruct each respective lock to transition between the locked or unlocked state every 1.0 second.

For example, the LTE chip may be positioned on a pin included in an electronic lock that is included in access control 320 such that the actuating mechanism and the bolt of the electronic lock are linked to network 180 via the NBIoT spectrum. Tenant communications device 140 that has been aggregated wireless control of the electronic lock may then obtain a status update of the actuating mechanism and/or bolt of the electronic lock every 1.0 second via the NBIoT spectrum. Tenant communications device 140 may then wirelessly control the electronic lock by instructing the electronic lock to transition the actuating mechanism and/or the bolt between the locked or unlocked state via the NBIoT spectrum every 1.0 seconds should the user request to do that. Thus, the user may wirelessly transition the actuating mechanism and/or the bolt of the electronic lock between the locked or unlocked state whenever requested by the user via tenant communications device 140 wirelessly controlling the electronic lock via the NBIoT spectrum.

Multi-tenant computing device 110 may aggregate wireless control of closed circuit cameras 310 to tenant communications device 140 such that the user may wirelessly control closed circuit cameras 310 for the tenant space and/or multi-tenant structure 130(a-n) that the user is inhabiting. For example, closed circuit cameras 310 may include closed circuit cameras 310 positioned throughout multi-tenant structure 130(a-n) that the user in inhabiting such that the user may have access to the video feeds captured by each closed circuit camera 310 that the user has wireless control. Closed circuit cameras 310 may be positioned throughout multi-tenant structure 130(a-n) such as but not limited to the garage, main entrance, lobby, ingress and egress points throughout multi-tenant structure 130(a-n) and/or any other position throughout multi-tenant structure 130(a-n) that closed circuit cameras 310 may be positioned.

After multi-tenant computing device 110 aggregates wireless control of each respective closed circuit camera 310 to tenant communications device 140 based on the permissions granted to the user in the agreement to inhabit the tenant space, tenant communications devices 140 may then stream the video feed captured from each respective closed circuit camera 310 and display the video feed to the user via user interface 170. For example, an individual may ring the doorbell associated with the tenant space of the user via the main entrance of multi-tenant structure 130(*a-n*) that the user is inhabiting. Multi-tenant computing device 110 may aggregate wireless control of closed circuit camera 310 positioned in the main lobby to tenant communications device 140 such that tenant communications device 140 may stream the video feed captured by closed circuit camera 310 positioned in the main lobby. In doing so, the user may request to have the video feed captured by closed circuit camera 310 positioned in the main lobby streamed by tenant communications device 140 and displayed by tenant communications device 140 to the user via user interface 170 such that the user may identify the individual who is ringing the doorbell associated with the tenant space of the user in the main entrance of multi-tenant structure 130(*a-n*) that the user is inhabiting.

In an embodiment, multi-tenant computing device 110 may stream the video feed of each closed circuit camera 310 positioned in multi-tenant structures 130(*a-n*) and store. In doing so, multi-tenant computing device 110 may stream the video feed of each closed circuit camera 310 positioned in multi-tenant structures 130(*a-n*) and store in the format of the video feed captured by each closed circuit camera 310. For example, each closed circuit camera 310 may generate a generic video stream such as but not limited to AB CH at 30 frames per second at 1080×1080 pixels as required for insurance purposes in that closed circuit cameras 310 positioned in multi-tenant structures 130(*a-n*) may require that the video stream generated by each closed circuit camera 310 be at 30 frames per second at 1080×1080 pixels. In such an example, multi-tenant computing device 110 may then stream the video feed of each closed circuit camera 310 at 30 frames per second at 1080×080 pixels and store.

Although the video stream generated by each closed circuit camera 310 may be at an increased resolution and thereby stored by multi-tenant computing device 110, the video stream generated by each closed circuit camera 310 that is then streamed to tenant communications device 140 and displayed to the user via user interface 170 is not required to be at the increased resolution. The video stream generated by each closed circuit camera 310 that is then streamed to tenant communications device 140 may be decreased in resolution as the video stream as generated by each closed circuit camera 310 that is then displayed by tenant communications device 140 typically does not require the increased resolution of the video stream originally generated by each closed circuit camera 310. Thus, the video stream generated by each closed circuit camera 310 that is displayed by tenant communications device 140 to the user may be significantly downgraded in order to decrease the amount of bandwidth of tenant communications device 140 that the video stream occupies thereby enabling tenant communications device 140 to display the video feed to the user without timing out and/or suffering delays in the displaying of the video stream.

In doing so, multi-tenant computing device 110 may stream the video stream generated by each closed circuit camera 310 at the increased resolution that each closed circuit camera 310 generates the video stream may then down convert increased resolution of the video stream as generated by each closed circuit camera 310 to a decreased resolution. Multi-tenant computing device 110 may then stream the video stream captured by each closed circuit camera 310 at the decreased resolution to tenant communications device 140 such that tenant communications device 140 may display the video stream captured by each closed circuit camera 310 at the decreased resolution thereby decreasing the amount of bandwidth of tenant communications device 140 that is occupied by the video stream of deceased resolution.

For example, each closed circuit camera 310 may generate the video feed at the increased resolution of 30 frames per second at 1080×1080 pixels. Multi-tenant computing device 110 may then stream the video feed generated by each closed circuit camera 310 at the increased resolution of 30 frames per second at 1080×1080 pixels and store. Multi-tenant computing device 110 may then down convert the video feed at the increased resolution by each closed circuit camera 310 by applying FFM PEG to each video feed and in doing so down convert the video feed at the increased resolution of 30 frames per second at 1080×0180 pixels to a decreased resolution of 320×240 pixels of 10 frames per second. Multi-tenant computing device 110 may then stream the video feed at the decreased resolution of 320×240 pixels of 10 frames per second to tenant communications device 140. Tenant communications device 140 may then display the video feed at the decreased resolution of 320×240 pixels of 10 frames per second to the user via user interface 170 and in doing so occupy decreased bandwidth of tenant communications device 140 thereby enabling tenant communications device 140 to display the video feed at the decreased resolution without timing out and/or delays.

The video feed streamed at the decreased resolution by multi-tenant computing device 110 to tenant communications device 140 and then displayed to the user at the decreased resolution enables the user to adequately identify any individual who is captured in the video feed as well as any other pertinent objects and/or situations but also occupies decreased bandwidth of tenant communications device 140 such that the video feed that is streamed at the decreased resolution is uninterrupted by time outs and/or delays. Closed circuit cameras 310 may generate the video feed at any type of resolution and multi-tenant computing device 110 may then decrease the resolution by incorporating any approach to any resolution that is decreased from the resolution of the video feed originally captured by closed circuit cameras 310 and may be displayed to the user via tenant communications device 140 that will be apparent to those skilled in the relevant art(s) without departing from the spirit and scope of the present disclosure.

Multi-tenant computing device 110 may identify the video feed generated by each closed circuit camera 310 based on the unique identifier associated with each closed circuit camera 310. Multi-tenant computing device 110 may then convert the unique identifier associated with each closed circuit camera 310 to a naming convention that may be likely identified by the user. Tenant communications device 140 may then display each of the naming conventions for each closed circuit camera 310 to the user via user interface 170 such that the user may then easily select the appropriate video feed generated from the appropriate closed circuit camera 310 that the user is requesting to view.

For example, multi-tenant computing device 110 may identify the video feed generated by closed circuit camera 310 that is positioned in the main lobby of multi-tenant structure 130(*a-n*) as well as the video feed generated by closed circuit camera 310 that is positioned in the garage of multi-tenant structure 130(*a-n*). Multi-tenant computing device 110 may identify the video feed generated by closed circuit camera 310 that is positioned in the main lobby based on the unique identifier of that closed circuit camera and may identify the video feed generated by closed circuit camera 310 that is positioned at the garage based on the unique identifier of that closed circuit camera. The unique identifiers of closed circuit cameras 310 may be unidentifiable by the user in that the user may not easily discern whether the unique identifier is associated with closed circuit camera 310 that is positioned at the main lobby or is associated with closed circuit camera 310 that is positioned in the garage. Multi-tenant computing device 110 may convert the unique identifier associated with closed circuit camera 310 that is positioned in the main lobby to the naming convention of "Main Lobby" and may convert the unique identifier associated with closed circuit camera 310 that is positioned in garage to the naming convention of "Garage".

Tenant communications device 140 may then display to the user the naming convention for each closed circuit camera 310 that may be easily identifiable to the user via user interface 170. In such an example, tenant communications device may display "Main Lobby" for the video feed generated by closed circuit camera 310 positioned in the main lobby and may display "Garage" for the video feed generated by closed circuit camera 310 positioned in the garage. The user may then select "Main Lobby" from user interface 170 and tenant communications device 140 may stream the video feed from closed circuit camera 310 that is positioned in the main lobby to the user via user interface 170. The user may then select "Garage" from user interface 170 and tenant communications device 140 may stream the video feed from closed circuit camera 310 positioned in the garage to the user via user interface 170.

Multi-tenant computing device 110 may aggregate wireless control of electronic devices associated with home automation 330 to tenant communications device 140 such that the user may wirelessly control the electronic devices associated with home automation 330 for the tenant space. For example, the electronic devices may include electronic devices associated with the home automation features of the tenant space that include but are not limited to the internet, thermostats, lighting, cable television, appliances, and/or any other feature associated with the home automation of the tenant space that will be apparent to those skilled in the relevant art(s) without departing from the spirit and scope of the invention. In doing so, the user granted such permissions may wirelessly control the different electronic devices of home automation 330 to adjust the corresponding electronic devices of home automation 330 as requested by the user. As noted above, the tenant space then has electronic devices of home automation 330 included in the tenant space that may be specific to the tenant space that may be wirelessly controlled by the user via tenant communications device 140. In doing so, the user may wirelessly adjust each electronic device of home automation 330 such that each electronic device of home automation 330 operates how the user requests.

As noted above, multi-tenant computing device 110 may aggregate wireless control of electronic devices of home automation 330 to tenant communications device 140 such that the user may wirelessly control the electronic devices of home automation 330 based on the service template for each electronic device of home automation 330. The user may wirelessly control each electronic device of home automation 330 via tenant communications device 140 as allowed by the service template for each electronic device of home automation 330. For example, the service template associated with the cable television of the tenant space may enable the user to wirelessly operate the DVR, change the channel and so on of the cable television as provided by the service template for the cable television.

In an embodiment, the user may wirelessly control each electronic device of home automation 330 via tenant communications device 140 based on a gateway 340 that interfaces with multi-tenant computing device 110. Gateway 340 may interface with the personal area network (PAN) that is associated with the tenant space such that each electronic device of home automation 330 that is positioned in the tenant space may interact with gateway 340 via the PAN. Multi-tenant computing device 110 may then interact with each electronic device of home automation 330 via gateway 340 in that multi-tenant computing device 110 may interact with gateway 340 via network 180. Multi-tenant computing device may then aggregate wireless control of each electronic device of home automation 330 to tenant communications device 140 based on the unique identifier of each electronic device of home automation 330. The user may then wirelessly control each electronic device of home automation 330 via tenant communications device 140 based on the unique identifier of each electronic device of home automation 330 aggregated to tenant communications device 140.

For example, gateway 340 may interact with the PAN of the tenant space such that gateway 340 may communicate with each electronic device of home automation 330 via the PAN may be but limited to a z-wave and/or zigbee PAN network. In doing so, gateway 340 may have established wireless communication with each electronic device of home automation 330. However, multi-tenant computing device 110 and/or tenant communications device 140 are not able to communicate with each electronic device of home automation 330 via the PAN. Rather, multi-tenant computing device 1110 and/or tenant communications device 140 may wirelessly control each electronic device of home automation 330 based on the unique identifier of each electronic device of home automation 330 via the Internet Protocol (IP) of network 180.

In order for multi-tenant computing device 110 and/or tenant communications device 140 to wirelessly control with each electronic device of home automation 330 based on the unique identifier of each electronic device of home automation 330, gateway 340 may convert the unique identifier of the IP of network 180 to the z-wave and/or zigbee of the PAN. In such a conversion, gateway 340 may convert the wireless communication of multi-tenant computing device 110 and/or tenant communications device 140 from the IP of network 180 to the z-wave and/or zigbee of the PAN and in doing so enable multi-tenant computing device 110 and/or tenant communications device 140 to wirelessly control the electronic devices of home automation 330 based on the unique identifier of each electronic device of home automation 330.

Wireless Control of Electronic Devices via a Communications Device

As noted above, multi-tenant computing device 110 may automatically aggregate wireless control of electronic devices associated with multi-tenant structures 130(a-n) to tenant communications device 140 such that the user may engage in wireless control of the electronic devices via tenant communications device 140 associated with permissions granted to the user. In doing so, tenant communications device 140 receive the associated permissions from multi-tenant computing device 110 and thereby wirelessly control the electronic devices that tenant communications device 140 has received permissions to wirelessly control. Tenant communications device 140 may then activate the wireless control of the electronic devices based on the permissions granted to tenant communications device 140.

Figure 4:
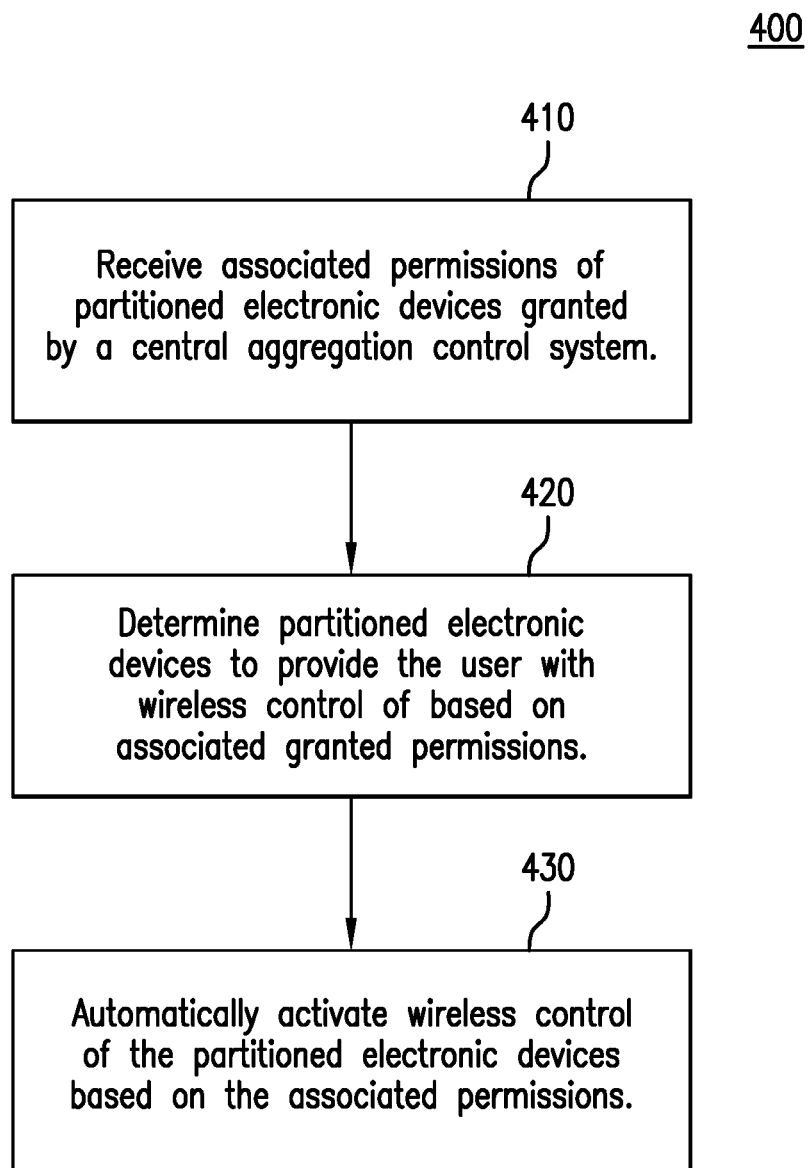
FIG. 4 shows an illustration of a method for activating wireless control.

One such implementation of activating wireless control is illustrated in process 400 in FIG. 4. Process 400 includes three primary steps: receive associated permissions of partitioned electronic devices granted by a central aggregation control system, such as multi-tenant computing device 110 410, determine partitioned electronic devices to provide the user with wireless control of based on associated granted permissions 420, and automatically activate wireless control of the partitioned electronic devices based on the associated permissions 430. Steps 410-430 are typically implemented in a computer, e.g., via software and/or hardware, e.g., tenant communications device 140.

In step 410, tenant communications device 140 may receive associated permissions granting wireless control of a plurality of partitioned electronic devices to the user from a central aggregation control system. The central aggregation control system may be a central system associated with multi-tenant structures 130(*a-n*) that monitors and determines the wireless control of electronic devices that should aggregated to each tenant communications device 140 for each user. For example, the central aggregation control system may be multi-tenant computing device 110. The partitioned electronic devices are a set of electronic devices in a plurality of electronic devices associated with multi-tenant structure 110(*a-n*) that are under wireless control and have the associated permissions granting wireless control of the partitioned electronic devices to the user.

As noted above, the user may enter into an agreement to inhabit the tenant space and in doing so may agree to take possession of the tenant space on a specified date. As the user signs the agreement to inhabit the corresponding tenant space included in multi-tenant structures 130(*a-n*), user data associated with the user is automatically streamed by multi-tenant computing device 110 from the API of multi-tenant structures 130(*a-n*). User data is data associated with the user that uniquely identifies the user such that multi-tenant computing device 110 may correctly grant wireless control to the partitioned electronic devices that the agreement to inhabit the tenant space included in multi-tenant structures 130(*a-n*) grants to the user. For example, user data includes but is not limited to the name of the user, social security number of the user, the mobile phone number associated with the communications device that the user requests to conduct the wireless control of the partitioned electronic devices, the address of the tenant space, and/or any other user data associated with the user that uniquely identifies the user such that multi-tenant computing device 110 may correctly grant the wireless control to the partitioned electronic devices to the user that will be apparent to those skilled in the relevant art(s) without departing from the spirit and scope of the invention.

After multi-tenant computing device 110 verifies the user data of the user that has entered into the agreement to inhabit the tenant space, multi-tenant computing device 110 may obtain the phone number associated with tenant communications device 140 that is designated for the user as stored in electronic device database 120. Multi-tenant computing device 110 may then automatically transmit to tenant communications device 140 access the wireless control of the partitioned electronic devices that the user is granted permissions to control based on the agreement to inhabit the tenant space. Rather than the representative of the management entity of multi-tenant structures 130(*a-n*) having to manually provision the wireless control of each electronic device that the user has been granted permission to wirelessly control, multi-tenant computing device 110 may instead automatically transmit to tenant communications device 140 the access to the wireless control of the electronic devices after the user data of the user has been verified by multi-tenant computing device 110. For example, multi-tenant computing device 110 may verify the name, social security number, the address of the tenant space included in multi-tenant structure 130(*a-n*) that the user has entered into the agreement to inhabit and the telephone number associated with tenant communications device 140.

Tenant communications device 140 may receive user data associated with the user from the central aggregation control system, such as multi-tenant computing device 110, when the user is granted associated permissions by the central aggregation control system. The user data is specific to the user that identifies the user and a location of multi-tenant structure 130(*a-n*) that the user is granted access. In an embodiment, once the user data of the user is verified by multi-tenant computing device 110, multi-tenant computing device 110 may then transmit to tenant communications device 140 a web link that tenant communications device 140 may then display to the user via user interface 170. The user may then engage user interface 170 and enter into the web link. In doing so, multi-tenant computing device 110 may verify based on the user data verified by the user via the web link that the user that has been granted the wireless control of the electronic devices based on the agreement to inhabit the tenant space is indeed the user that is engaging tenant communications device 140 that multi-tenant computing device 110 is to aggregate wireless control of the electronic devices that the user has been granted permissions.

Tenant communications device 140 may then verify an identification of the user and the location of multi-tenant structure 130(*a-n*) that the user is granted access based on the user data. The user via tenant computing device 140 may then engage the web link displayed via user interface 170 to have multi-tenant computing device 110 aggregate the wireless control of each of the electronic devices that the user has been granted permissions to tenant communications device 140. Tenant communications device 140 may then establish an authenticated wireless connection to the central aggregation control system, such as multi-tenant computing device 110, when the identification of the user and the location of the multi-tenant structure 130(*a-n*) that the user is granted access based on the user data is verified. The authenticated wireless connection is a wireless connection to the central aggregation control system that is unique to the user data associated with the user to prevent the user from having wireless control of the electronic devices that do not have the associated permissions to the user.

As noted above, multi-tenant computing device 110 may verify the user that the has been granted permissions to engage in wireless control of the electronic devices based on the user data associated with the user that is streamed via the APIs of multi-tenant structures 130(*a-n*). The user data associated with the user is streamed to multi-tenant computing device 110 when the user enters into the agreement to inhabit the tenant space. Multi-tenant computing device 110 may then verify that tenant communications device 140 the user requests to have the wireless control of the electronic devices aggregated based on the user data that is verified by the user and again by multi-tenant computing device 110 when multi-tenant computing device 110 transmits the web link to tenant communications device 140. Once the user verifies the user data by click on the web link and multi-tenant communications device 110 verifies tenant communications device 140 as being associated with the user, then an authenticated wireless connection between multi-tenant computing device 110 and tenant communications device 140 is established. In doing so, multi-tenant computing device 110 may aggregate wireless control of the electronic devices that the user has permissions to tenant communications device 140 while preventing any other user via any other communications device from having wireless control of such electronic devices that fail to have such an authenticated wireless connection. In an example embodiment, step 410 may be performed by processor 145 of tenant communications device 140.

In step 420, tenant communications device 140 may determine the plurality of partitioned electronic to provide the user with wireless control of the partitioned electronic devices based on the associated permissions granted to the user. As noted above, multi-tenant computing device 110 may aggregate wireless control of the electronic devices that the user has been granted permissions to tenant communications device 140. Tenant communications device 140 may then determine the appropriate electronic devices that tenant communications device 140 may have wireless control of based on the associated permissions provided to tenant communications device from multi-tenant computing device 110. Tenant communications device 140 may determine the associated permissions granted to the user for the user to have wireless control over the partitioned electronic devices when the authenticated wireless connection is established. Access to the associated permissions from the central aggregation control system, such as multi-tenant computing device 110, is granted when the user data is verified. In example embodiment, step 420 may be performed by processor 145 of tenant communications device 140.

In step 430, tenant communications device 140 may automatically activate wireless control of the partitioned electronic devices when the associated permissions for the user grant the user with the wireless control of the partitioned electronic devices and prevent the user from having wireless control of the electronic devices that do not have the associated permissions. Tenant communications device 140 may automatically activate wireless control of the partitioned electronic devices to the user when the user data is verified and the associated permissions for the user grant the user with the wireless control of the partitioned electronic devices. Once the user is verified by multi-tenant computing device 110 and tenant communications device 140 is verified by multi-tenant computing device 110 as being associated with the user, tenant communications device 140 may launch the wireless control of the electronic devices that has been aggregated to tenant communications device 140 by multi-tenant computing device 110. Rather than having the representative of the management company of multi-tenant structures 130(a-n) manually provision the wireless control of each electronic device to the user, tenant communications device 140 may automatically activate such wireless control upon the user taking possession of the tenant space after the appropriate verification by multi-tenant computing device 110 has been executed.

Tenant communications device 140 may wirelessly control each partitioned electronic device associated with multi-tenant structures 130(a-n) that includes a unique identifier that corresponds to the associated permissions granted to the user and prevent wireless control of the electronic devices that includes unique identifiers that are not associated with the associated permissions granted to the user. As noted above, each electronic device may have a corresponding unique identifier. After the wireless control of each of the electronic devices has been aggregated to tenant communications device 140 based on the unique identifier associated with each electronic device, tenant communications device 140 may then in turn wirelessly control each electronic device based on the corresponding unique identifier.

In doing so, tenant communications device 140 may wirelessly control each partitioned electronic device based on each corresponding service template associated with each partitioned electronic device thereby enabling the user to have wireless control of each partitioned electronic device based on the service template associated with each partitioned electronic device. The service template associated with each partitioned electronic device provides a plurality of features that the user has wireless control of for each partitioned electronic device. For example, tenant communications device 140 may adjust the Internet service associated with the tenant space based on the service template associated with the Internet service. In example embodiment, step 430 may be performed by processor 145 of tenant communications device 140.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. A communications device for providing a user with wireless control of a plurality of partitioned electronic devices associated with a multi-tenant structure to enable a user to engage in wireless control of the plurality of partitioned electronic devices associated with a plurality of permissions granted to the user, comprising:

at least one processor; and a memory coupled with the processor, the memory including instructions that when executed by the processor cause the processor to:

receive an identification, prior to a trigger date identified by an agreement entered into by the user, of a tenant structure of a plurality of tenant structures in the multi-tenant structure for which the user is to, upon the trigger date, inhabit, the tenant structure being uniquely identified in the agreement relative to other tenant structures of the plurality of tenant structures;

receive in response to the agreement and prior to the trigger date, associated permissions, based at least in part on the identification of the tenant structure identified by the agreement, the associated permissions being stored for a future granting of wireless control of the plurality of partitioned electronic devices to the user from a central aggregation control system associated with the tenant structure, wherein the plurality of partitioned electronic devices are a set of electronic devices included in a plurality of electronic devices associated with the plurality of tenant structures of the multi-tenant structure that are under wireless control and have the associated permissions granting wireless control of the plurality of partitioned electronic devices to the user based on the associated permissions granted to the user via an agreement that the user entered to inhabit the tenant structure included in the multi-tenant structures;

determine, prior to the trigger date, an identification of the plurality of partitioned electronic devices to provide the user with wireless control based on the associated permissions granted to the user that are to be aggregated from the central aggregation control system and permissions that are not granted to the user by the central aggregation control system, wherein the associated permissions are aggregated based on the agreement entered into by the user to inhabit the tenant structure upon satisfaction of the trigger date, the identification of the plurality of partitioned electronic devices being stored by the system prior to trigger date;

automatically activate wireless control of the plurality of partitioned electronic devices when the associated permissions for the user grant the user with the wireless control of the plurality of partitioned electronic devices and prevent the user from having wireless control of the electronic devices that do not have the associated permissions, wherein automatic activation of the plurality of partitioned electronic devices with the associated permissions are triggered in response to a satisfaction of the trigger date for the user to inhabit the tenant structure; and wirelessly control each partitioned electronic device based on each corresponding service template associated with each partitioned electronic device thereby enabling the user to have wireless control of each partitioned electronic device based on the service template associated with each partitioned electronic device, wherein the service template associated with each partitioned electronic device provides a plurality of features that the user has wireless control of for each corresponding partitioned electronic device.

2. The communications device of claim 1, wherein the processor is further configured to:

receive user data associated with the user from the central aggregation control system when the user is granted associated permissions by the central aggregation control system, wherein the user data is specific to the user that identifies the user and a location of the multi-tenant structure that the user is granted access;

verify an identification of the user and the location of the multi-tenant structure that the user is granted access based on the user data; and automatically activate wireless control of the plurality of partitioned electronic devices to the user when the user data is verified and the associated permissions for the user grant the user with the wireless control of the plurality of partitioned electronic devices.

3. The communications device of claim 2, wherein the processor is further configured to:

establish an authenticated wireless connection to the central aggregation control system when the identification of the user and the location of the multi-tenant structure that the user is granted access based on the user data is verified, wherein the authenticated wireless connection is a wireless connection to the central aggregation control system that is unique to the user data associated with the user to prevent the user from having wireless control of the electronic devices that do not have the associated permissions granted to the user; and determine the associated permissions granted to the user for the user to have wireless control over the plurality of partitioned electronic devices when the authenticated wireless connection is established, wherein access to the associated permissions from the central aggregation control system is granted when the user data is verified.

4. The communications device of claim 1, wherein the processor is further configured to wirelessly control each of the partitioned electronic devices associated with the multi-tenant structure that includes a unique identifier that corresponds to the associated permissions granted to the user and prevent wireless control of the electronic devices that include unique identifiers that are not associated with the associated permissions granted to the user.

5. The communications device of claim 1, wherein the processor is further configured to:

wirelessly control a plurality of common electronic devices based on the associated permissions granted to the user, wherein the plurality of common electronic devices is accessible to the user and other users that have the associated permissions to wirelessly control the plurality of common electronic devices.

6. The communications device of claim 1, wherein the processor is further configured to:

wirelessly control a plurality of unit devices with unique identifiers that correspond to the unit of the multi-tenant structure that the user has access, wherein the plurality of unit devices is associated with the unit included in the multi-unit structure that the user has access.

7. The communications device of claim 1, wherein the processor is further configured to:

wirelessly control a plurality of locksets associated with the multi-tenant structure that the user has access when the associated permissions for the user grant the user with the wireless control of the plurality of locksets and prevent the user from having wireless control of locksets that do not have the associated permissions.

8. The communications device of claim 1, wherein the processor is further configured to:

display a plurality of video streams as captured by a plurality of imaging devices associated with the multi-tenant structure to the user when the associated permissions for the user grant the user with access to the plurality of video streams as captured by the plurality of imaging devices and prevent the user from having access to video streams captured by imaging devices that do not have the associated permissions.

9. The communications device of claim 1, wherein the processor is further configured to:

automatically terminate wireless control of the plurality of partitioned electronic devices when the associated permissions for the wireless control of the plurality of partitioned electronic devices is terminated thereby preventing the user from having wireless control of the plurality of partitioned electronic devices.

10. The communications device of claim 1, further comprising automatically deactivate, for a second user, wireless control of the plurality of partitioned electronic devices upon the satisfaction of the trigger date, the second user having had wireless control of the plurality of partitioned electronic devices for a time period immediately preceding the trigger date, and
   wherein the plurality of partitioned electronic devices comprises a plurality of electronic devices for a home automation system for the tenant space.

11. A method for providing a user with wireless control of a plurality of partitioned electronic devices associated with a multi-tenant structure to enable a user to engage in wireless control of the plurality of partitioned electronic devices associated with a plurality of permissions granted to the user, comprising:
   receiving an identification, prior to a trigger date identified by an agreement entered into by the user, of a tenant structure of a plurality of tenant structures in the multi-tenant structure for which the user is to, upon the trigger date, inhabit, the tenant structure being uniquely identified in the agreement relative to other tenant structures of the plurality of tenant structures;
   receiving associated permissions, based at least in part on the identification of the tenant structure identified by the agreement, granting wireless control of the plurality of partitioned electronic devices to the user from a central aggregation control system associated with the tenant structure, wherein the plurality of partitioned electronic devices are a set of electronic devices included in a plurality of electronic devices associated with the plurality of tenant structures of the multi-tenant structure that are under wireless control and have the associated permissions granting wireless control of the plurality of partitioned electronic devices to the user based on the associated permissions granted to the user via an agreement that the user entered to inhabit the tenant structure included in the multi-tenant structure;
   determining, prior to the trigger date, an identification of the plurality of partitioned electronic devices to provide the user with wireless control based on the associated permissions granted to the user that are aggregated from the central aggregation control system and permissions that are not granted to the user by the central aggregation control system, wherein the associated permissions are aggregated based on the agreement entered into by the user to inhabit the tenant structure;
   storing the identification of the plurality of partitioned electronic devices prior to trigger date;
   automatically activating wireless control of the plurality of partitioned electronic devices when the associated permissions for the user grant the user with the wireless control of the plurality of partitioned electronic devices and prevent the user from having wireless control of the electronic devices that do not have the associated permissions, wherein automatic activation of the plurality of partitioned electronic devices with the associated permissions are triggered in response to a satisfaction of the trigger date for the user to inhabit the tenant structure; and
   wirelessly controlling each partitioned electronic device based on each corresponding service template associated with each partitioned electronic device thereby enabling the user to have wireless control of each partitioned electronic devices based on the service template associated with each partitioned electronic device, wherein the service template associated with each partitioned electronic device provides a plurality of features that the user has wireless control for each corresponding partitioned electronic device.

12. The method of claim 11, further comprising:
receiving user data associated with the user from the central aggregation control system when the user is granted associated permissions by the central aggregation control system, wherein the user data is specific to the user that identifies the user and a location of the multi-tenant structure that the user is granted access;
verifying an identification of the user and the location of the multi-tenant structure that the user is granted access based on the user data; and
automatically activating wireless control of the plurality of partitioned electronic devices to the user when the user data is verified and the associated permissions for the user grant the user with the wireless control of the plurality of partitioned electronic devices.

13. The method of claim 12, further comprising:
establishing an authenticated wireless connection to the central aggregation control system when the identification of the user and the location of the multi-tenant structure that the user is granted access based on the user data is verified, wherein the authenticated wireless connection is a wireless connection to the central aggregation control system that is unique to the user data associated with the user to prevent the user from having wireless control of the electronic devices that do not have the associated permissions to the user; and
determining the associated permissions granted to the user for the user to have wireless control over the plurality of partitioned electronic devices when the authenticated wireless connection is established, wherein access to the associated permissions from the central aggregation control system is granted when the user data is verified.

14. The method of claim 11, further comprising:
wirelessly controlling each of the partitioned electronic devices associated with the multi-tenant structure that includes a unique identifier that corresponds to the associated permissions granted to the user and prevent wireless control of the electronic devices that include unique identifiers that are not associated with the associated permissions granted to the user.

15. The method of claim 11, further comprising:
wirelessly controlling a plurality of common electronic devices based on the associated permissions granted to the user, wherein the plurality of common electronic devices is accessible to the user and other users that have the associated permissions to wirelessly control the plurality of common electronic devices.

16. The method of claim 11, further comprising:
wirelessly controlling a plurality of unit devices with unique identifiers that correspond to the unit of the multi-tenant structure that the user has access, wherein the plurality of unit devices is associated with the unit included in the multi-unit structure that the user has access, wherein the plurality of unit devices is associated with the unit included in the multi-unit structure that the user has access.

17. The method of claim 11, further comprising:
wirelessly controlling a plurality of locksets associated with the multi-tenant structure that the user has access when the associated permissions for the user grant the user with the wireless control of the plurality of locksets and prevent the user from having wireless control of locksets that do not have the associated permissions.

18. The method of claim 11, further comprising:
displaying a plurality of video streams as captured by a plurality of imaging devices associated with the multi-tenant structure to the user when the associated permissions for the user grant the user with access to the plurality of video streams as captured by the plurality of imaging devices and prevent the user from having access to video streams captured by imaging devices that do not have the associated permissions.

19. The method of claim 11, further comprising:
automatically terminating wireless control of the plurality of partitioned electronic devices when the associated permissions for the wireless control of the partitioned electronic devices is terminated thereby preventing the user from having wireless control of the partitioned electronic devices.

* * * * *